(12) United States Patent
Chida et al.

(10) Patent No.: US 8,419,055 B2
(45) Date of Patent: Apr. 16, 2013

(54) AIRBAG AND METHOD OF MANUFACTURING SAME

(75) Inventors: Yusuke Chida, Wako (JP); Makoto Nagai, Wako (JP); Hiroyuki Nozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 13/059,259

(22) PCT Filed: Sep. 16, 2009

(86) PCT No.: PCT/JP2009/066140
§ 371 (c)(1), (2), (4) Date: Feb. 16, 2011

(87) PCT Pub. No.: WO2010/032744
PCT Pub. Date: Mar. 25, 2010

(65) Prior Publication Data
US 2011/0140400 A1    Jun. 16, 2011

(30) Foreign Application Priority Data

| Sep. 17, 2008 | (JP) | 2008-238661 |
| Sep. 17, 2008 | (JP) | 2008-238665 |
| Sep. 17, 2008 | (JP) | 2008-238699 |
| Sep. 17, 2008 | (JP) | 2008-238700 |

(51) Int. Cl.
*B60R 21/30* (2006.01)

(52) U.S. Cl.
USPC ...... 280/739; 280/731; 280/743.1; 280/743.2

(58) Field of Classification Search ............... 280/731, 280/739, 743.1, 743.2
See application file for complete search history.

(56) References Cited

U.S. PATENT DOCUMENTS

| 6,832,778 | B2* | 12/2004 | Pinsenschaum et al. ..... 280/739 |
| 7,458,607 | B2* | 12/2008 | Abe ............... 280/739 |
| 7,726,685 | B2* | 6/2010 | Abe et al. ............. 280/736 |
| 7,976,063 | B2* | 7/2011 | Abe et al. ............. 280/743.1 |
| 8,070,183 | B2* | 12/2011 | Kumagai et al. ........ 280/743.2 |
| 2005/0098990 | A1* | 5/2005 | Pinsenschaum et al. ..... 280/739 |
| 2006/0192371 | A1* | 8/2006 | Abe ............... 280/739 |
| 2007/0045997 | A1* | 3/2007 | Abe et al. ............. 280/729 |

FOREIGN PATENT DOCUMENTS

| EP | 1695877 | 8/2006 |
| JP | 07-329694 | 12/1995 |
| JP | 09-011845 | 1/1997 |
| JP | 2001-277991 | 10/2001 |
| JP | 2005-199987 | 7/2005 |
| JP | 2006-264662 | 10/2006 |
| JP | 2007-302224 | 11/2007 |

* cited by examiner

*Primary Examiner* — Toan To
(74) *Attorney, Agent, or Firm* — Rankin, Hill & Clark LLP

(57) ABSTRACT

An airbag, wherein gas is appropriately discharged from a vent hole by preventing a vent hole cover from being positionally displaced relative to the vent hole. An airbag (30) is provided with a cover guide member (70) which allows a vent hole cover (60) to move at a predetermined bag inner pressure to open a vent hole (34). The cover guide member has an opening (77) formed at a position corresponding to the vent hole.

9 Claims, 16 Drawing Sheets

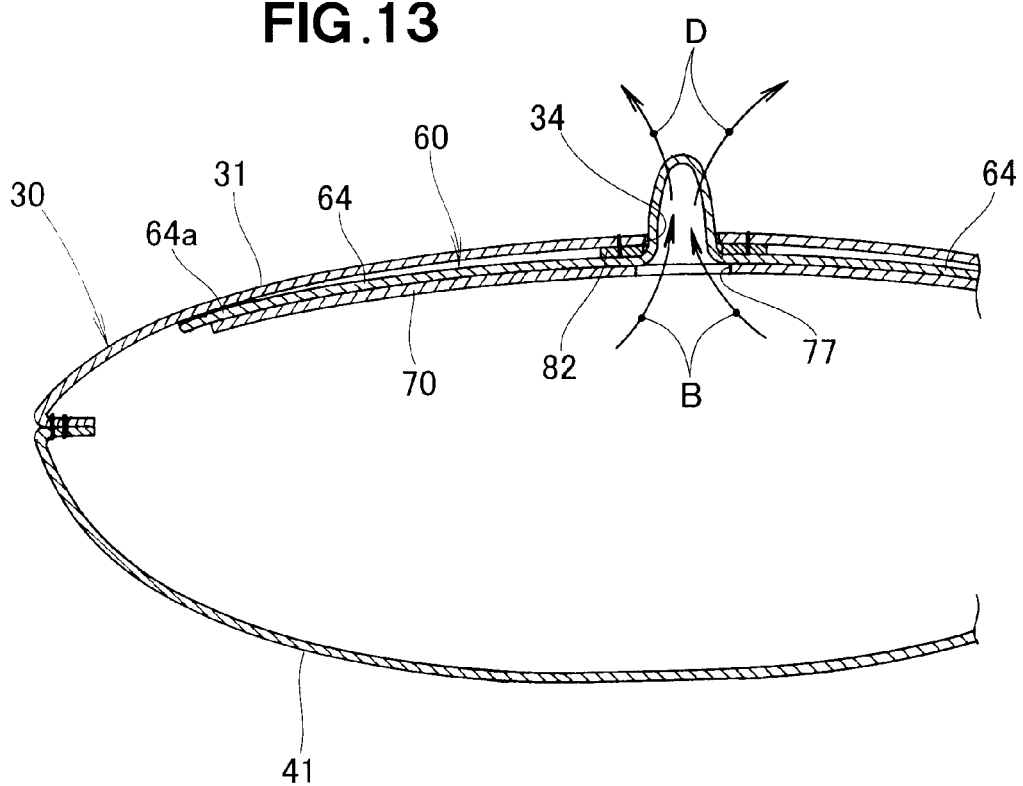

FIG.14
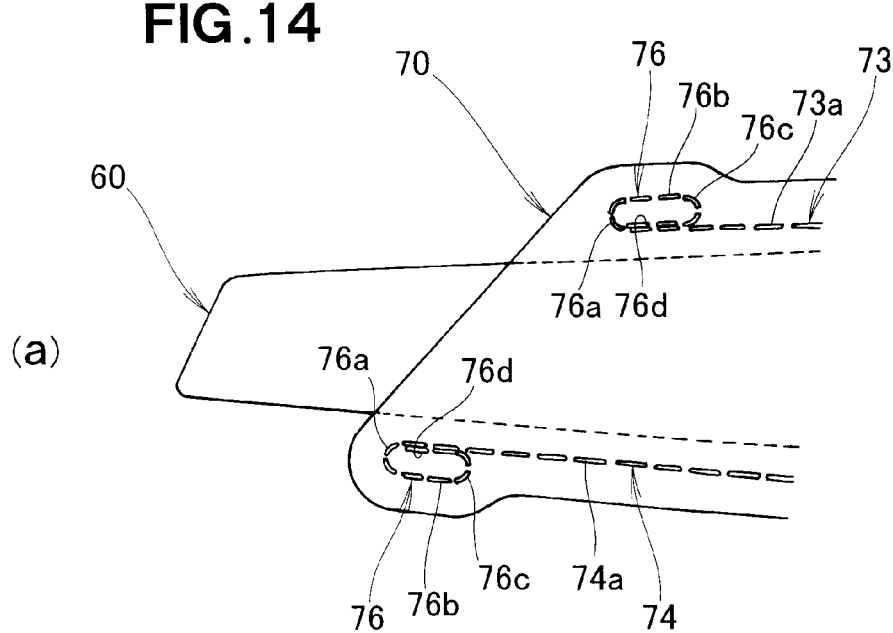
(a)
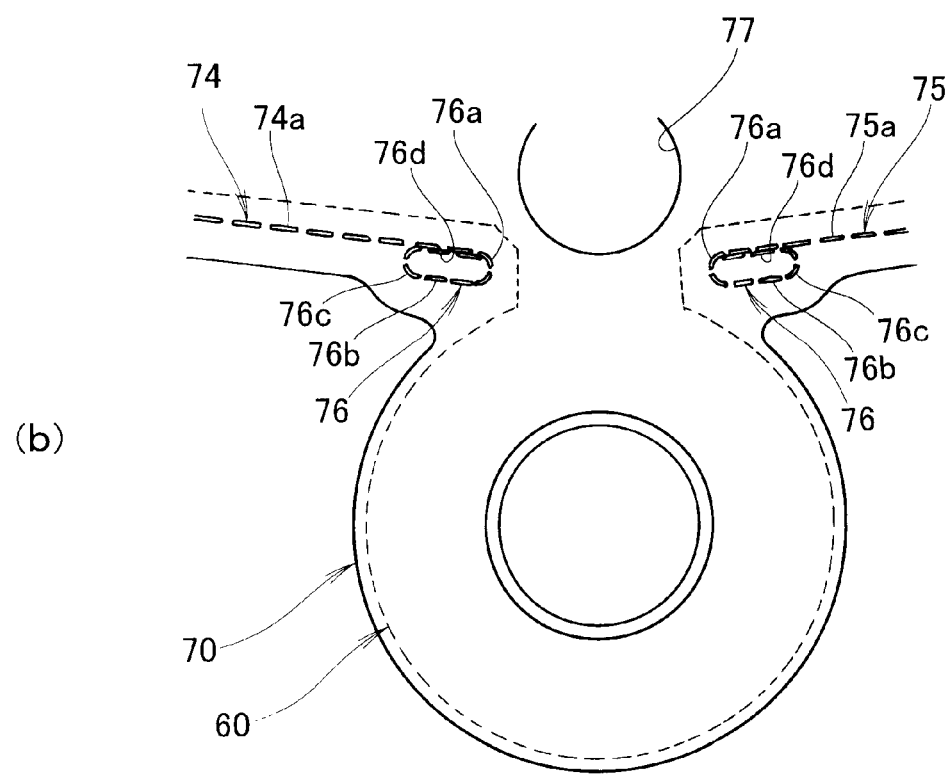
(b)

FIG.15
(a) 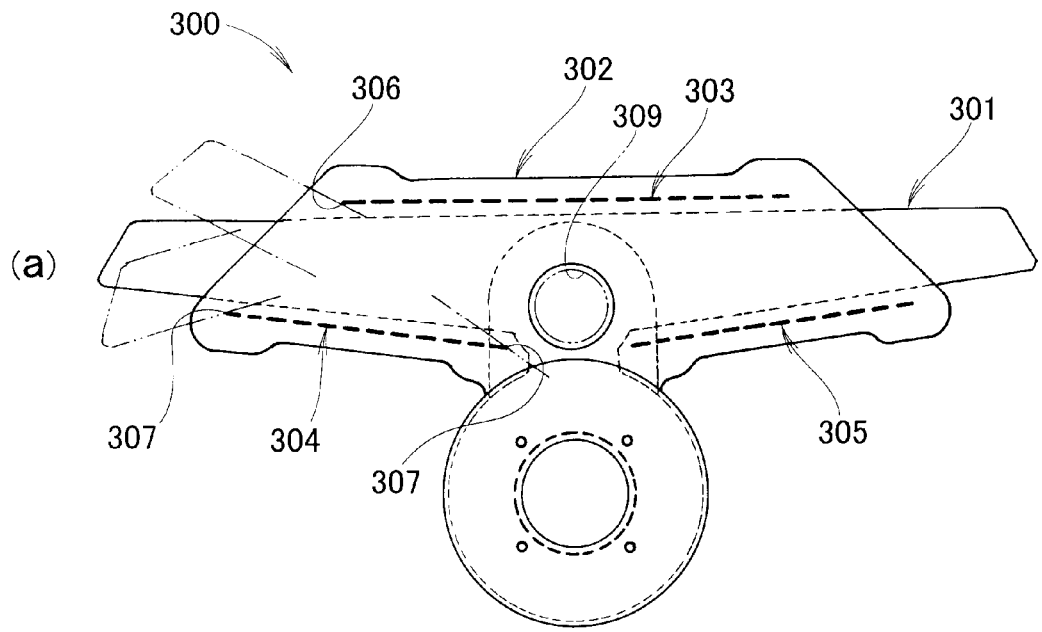
(b) 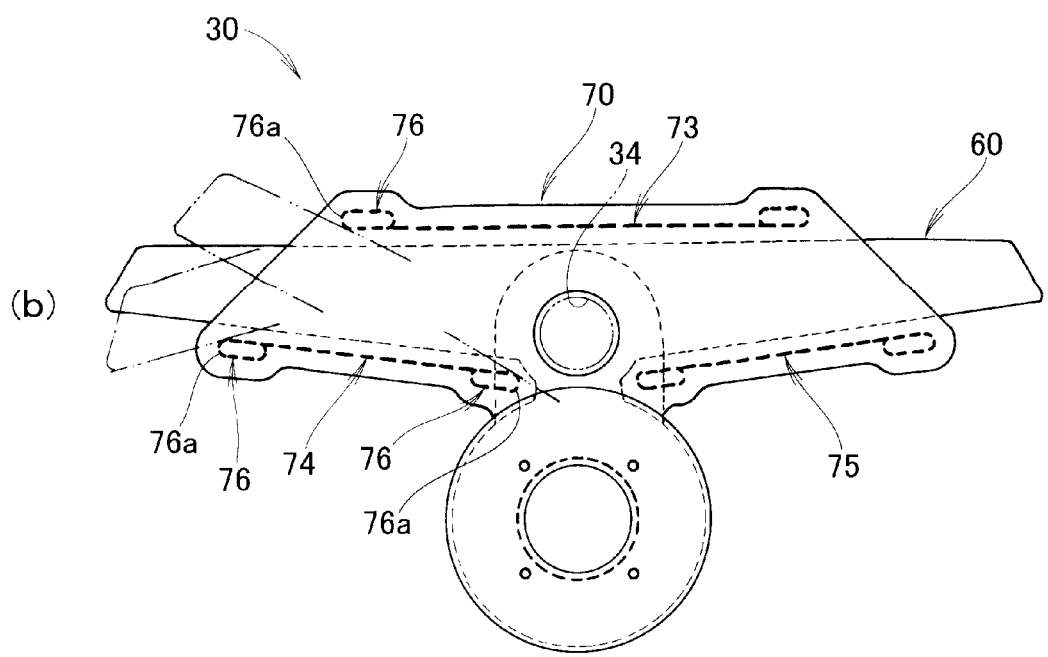

AIRBAG AND METHOD OF MANUFACTURING SAME

TECHNICAL FIELD

The present invention relates to an airbag that can expand and deploy between a vehicle body and a seated passenger by introducing gas generated by an inflator.

BACKGROUND ART

There are airbags that restrict the discharge of gas from a vent hole provided to the airbag by having the vent hole covered with a vent hole cover when the airbag is deployed using gas introduced from the inflator. The vicinity of the vent hole is supported by a cover guide member so that the vent hole cover does not become displaced from the vent hole (see, e.g., Patent Document 1).

In accordance with the airbag disclosed in Patent Document 1, the discharge of gas is restricted by the vent hole cover until the airbag is deployed in a shape that can restrain the passenger. When the airbag has deployed until a shape that can restrain the passenger is formed, the thread holding the vent hole cover is severed.

The vent hole cover is released from the thread when the thread is severed, the vent hole cover is pressed from the vent hole to the exterior of the airbag, and gas is released to the exterior from the gap formed between the vent hole cover and the vent hole, whereby the internal pressure of the airbag can be adjusted.

The airbag of Patent Document 1 has a cover guide member that supports the vicinity of the vent hole so that the vent hole cover does not become displaced from the vent hole. However, the cover guide member does not support the area that corresponds to the vent hole (i.e., the area that blocks the vent hole) and it is therefore difficult to provide support so that the area that corresponds to the vent hole does not become displaced (positionally displaced) from the vent hole.

For this reason, it is possible that gas discharges to the exterior from the vent hole before the airbag deploys to a shape that can provide restraint. In view of this possibility, the amount of gas discharged by the inflator must be increased a certain amount in order to adequately deploy the airbag.

PRIOR ART LITERATURE

Patent Document

Patent Document 1: Japanese Patent Application Laid-Open Publication No. 2005-199987 A

SUMMARY OF INVENTION

Technical Problem

It is therefore an object of the present invention to provide an airbag that can restrict positional displacement of a vent hole cover from a vent hole and suitably discharge gas from the vent hole.

Solution to Problem

According to a first aspect of the present invention, there is provided an airbag adapted to be deployed using gas introduced from an inflator and having a vent hole for allowing the gas to be released to outside, the airbag comprising: a vent hole cover for covering the vent hole, the vent hole cover being capable of moving such that the vent hole opens at a predetermined internal pressure produced in the airbag; and a cover guide member (70) for covering the vent hole cover and for allowing the vent hole cover to move so as to open the vent hole at the predetermined internal pressure, wherein the cover guide member has an opening formed in a part thereof corresponding to the vent hole.

Preferably, the vent hole cover comprises: an extension part extending from a part corresponding to the inflator; and an orthogonal part extending in a direction substantially orthogonal to the extension part from a distal end of the extension part, wherein the extension part and the orthogonal part form substantially a T-shape, and an intersecting part (66) in which the extension part and the orthogonal part intersect is formed so as to correspond to the vent hole, and the cover guide member extends toward two sides of the intersecting part so as to face the orthogonal part.

Desirably, the cover guide member has a distance dimension from a distal end of the cover guide member to the vent hole, and the distance dimension is greater than a distance dimension from the distal end of the cover guide member to a distal end of the vent hole cover.

In a preferred form, the distal end of the cover guide member is formed so as to slope toward the orthogonal part.

The extension part preferably has first side edges while the orthogonal part may have second side edges. Distances from corner edges where the first and second side edges intersect to a peripheral edge of the vent hole may be set to be less than a distance from a part other than the vent hole cover to the peripheral edge of the vent hole.

It is desirable that the corner edges substantially match a peripheral edge of the opening of the cover guide member.

In a preferred form, the cover guide member is sewn to a base cloth of the airbag and has a sewn end with stress concentration-reducing portions for reducing stress concentration on the sewn end.

Each of the stress concentration-reducing portion may be formed arcuately.

According to another aspect of the present invention, there is provided a method for manufacturing an airbag formed by joining two base cloths together, comprising the steps of: forming a vent hole in one of the base cloths; joining a vent hole cover for covering the vent hole, in the base cloth in which the vent hole formed; joining a cover guide member for restricting movement of the vent hole cover, in the base cloth in which the vent hole is formed; and joining peripheries of the base cloths.

Preferably, the method further comprises the steps of securing end parts of the vent hole cover to the base cloths by joining the peripheries of the base cloths and then sewing the base cloths using breakable sewing yarn.

Desirably, the base cloth in which the vent hole is formed, the vent hole cover and the cover guide member are formed from sheets of the same material having different friction characteristics on front and back surfaces. The front surface and the back surface of the sheets may be arranged so as to face each other between each of the members.

Advantageous Effects of Invention

The airbag in the airbag device of the present invention is provided with a vent hole cover for covering the vent hole. A cover guide member is furthermore provided for covering the vent hole cover. Thus, positional displacement of the vent hole cover from vent hole can be restricted by the cover guide member. Gas can thereby be prevented from being discharged from the vent hole to the exterior before the airbag deploys to a shape that can provide restraint. Therefore, gas can be suitably discharged from the vent hole and the airbag can adequately deploy.

Additionally, an opening is formed in the cover guide member in an area that corresponds to the vent hole. Accordingly, the internal pressure of the airbag can be made to act via the opening in the vent hole cover. The vent hole cover can thereby be moved at a predetermined internal pressure so as to open the vent hole when the pressure in the airbag bag unit has increased to a predetermined internal pressure. Therefore, a gap is formed between the vent hole cover and the vent hole and gas is released to the exterior from the gap thus formed, whereby the internal pressure of the airbag bag unit can be suitably adjusted.

In the airbag, the extension part and the orthogonal part of the vent hole cover form substantially a T-shape, and the intersecting part of the extension part and the orthogonal part correspond to the vent hole. The cover guide member extends toward the two side of the intersecting part so as to face the orthogonal part. Thus, the cover guide member covers the intersecting part that corresponds to the vent hole, and the two sides of the intersecting part can be covered by the cover guide member. Positional displacement of the vent hole cover from the vent hole can therefore be more adequately restricted by the cover guide member.

In the airbag, the distance dimension from the distal end of the cover guide member to the vent hole is made to be greater than the length distance (i.e., length distance of the exposed area) from the distal end of the cover guide member to the distal end of the vent hole cover. Accordingly, the exposed area can be prevented from reaching as far as the opening and being drawn into the opening in the case that the exposed area is folded back to the opening side in the deployment process. Therefore, the vent hole cover can be made to reliably move so as to open the vent hole.

Furthermore, in the airbag, the distal end of the cover guide member is formed so as to slope toward the orthogonal part. Thus, in the deployment process, the exposed area is restricted in the fold back direction in a state sloped toward the movement direction at the left/right distal ends. The frictional force generated in the area thus folded back can thereby be reduced in the case that the folded back area makes contact with the distal end of the cover guide member. Therefore, the vent hole cover can be made to smoothly move so as to open the vent hole.

In the present invention, the distance from the corner edge where the side edge of the extension part and the side edge of the orthogonal part intersect to the peripheral edge of the vent hole is set to be less than the distance from the other areas of the vent hole cover to the peripheral edge of the vent hole. Therefore, a gap is favorably formed between the corner edge and the vent hole when a gap is formed between the other areas of the vent hole cover and the vent hole. Gas is thereby favorably discharged from the gap thus formed to the exterior, deformation of the vent hole cover is reduced, and the internal pressure of the airbag can be advantageously adjusted.

In the airbag, an opening is formed in an area of the cover guide member that corresponds to the vent hole, and the peripheral edge of the opening substantially matches the corner edge. Thus, the corner edge can be prevented from covering the cover guide member. Therefore, gas can be favorably released to the exterior from the gap formed between the corner edge and the vent hole, and the internal pressure of the airbag can be even more advantageously adjusted.

The cover guide member can be prevented from peeling away from the base cloth of the airbag because the cover guide member has a stress concentration-reducing portion at each sewing end.

Interference between the guide member and the vent hole cover can be prevented and smooth movement of the vent hole cover can be achieved because the stress concentration-reducing portion is formed in an arcuate shape.

In the method according to another aspect of the present invention, two base cloths can be joined together after the vent hole cover, the guide member, and all other functional components have been arranged on one of the base cloths. Handling is thereby facilitated during the manufacture of the airbag bag unit, and the productivity of the airbag can be improved.

The method of the present invention reduces the chance of positional displacement of the vent hole cover because the vent hole cover is secured to one of the base cloths and the end part of the vent hole cover is secured to two base cloths.

The friction characteristics (slip characteristics) between the base cloth in which the vent hole has been formed, the vent hole cover, and the cover guide member can be made uniform because the front surface and the back surface of the sheet, which has different friction characteristics on the front and back, are arranged so as to face each other between each member.

BRIEF DESCRIPTION OF DRAWINGS

FIG. 13 is a cross-sectional view showing a state of gas being discharged through the vent hole of the airbag outside;

FIG. 14 is illustrates a stress concentration-reducing portion of the cover guide member;

FIG. 15 illustrates a comparison between the cover guide member without the stress concentration-reducing portion and the cover guide member according to the present example;

DESCRIPTION OF EMBODIMENTS

Certain preferred embodiments of the present invention are described below with reference to the accompanying drawings.

Figure 1:
FIG. 1 is a perspective view illustrating a vehicle provided with an airbag according to the present invention.

A vehicle 10 shown in FIG. 1 has a vehicle airbag device 13 accommodated in a steering wheel 12 disposed in front of a driver's seat 11. The vehicle airbag device 13 deploys in front of the driver and restrains and protects the driver (passenger) when the vehicle 10 has been subjected to the energy of a collision.

Figure 2:
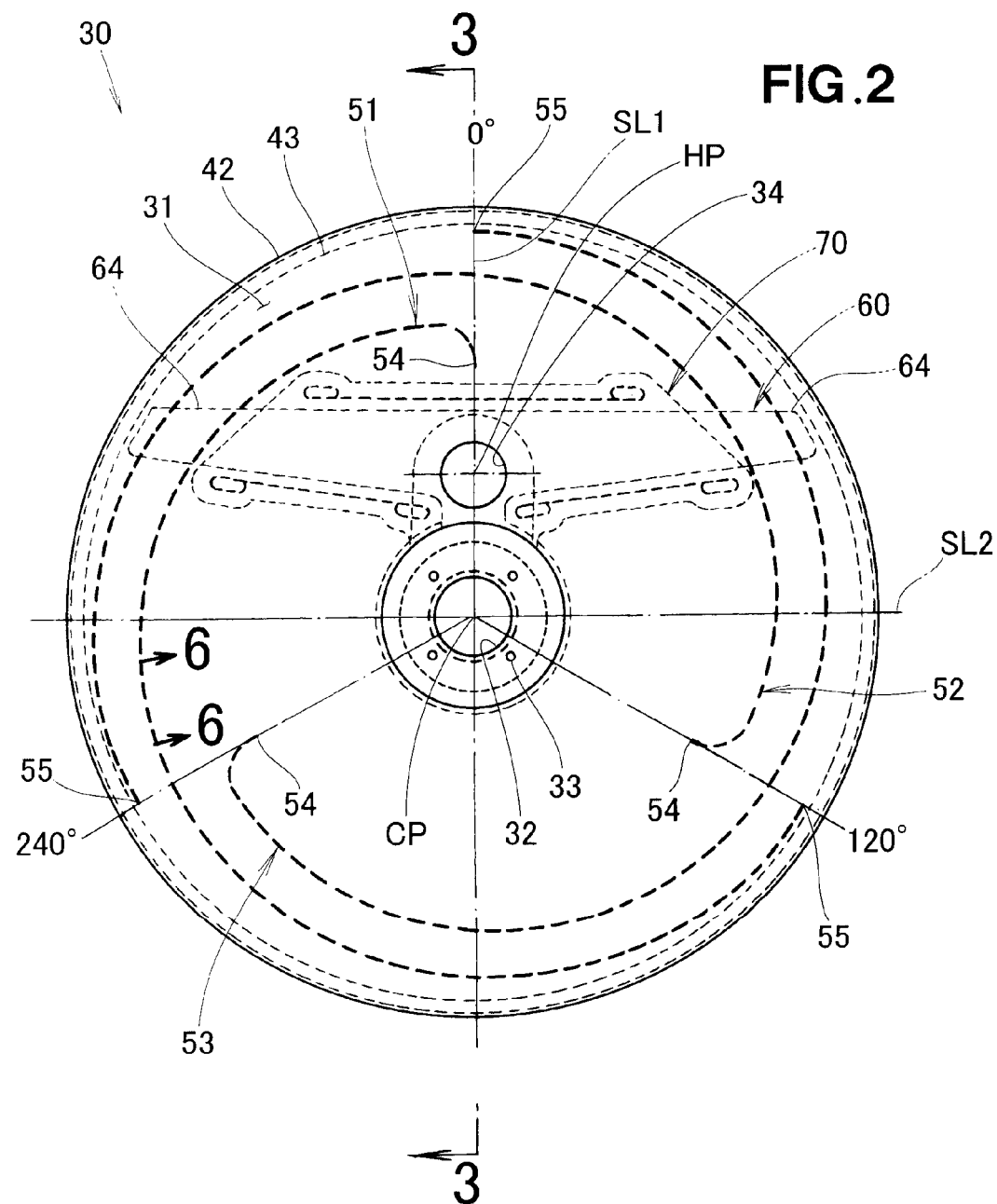
FIG. 2 is a rear elevational view of the airbag.
Figure 3:
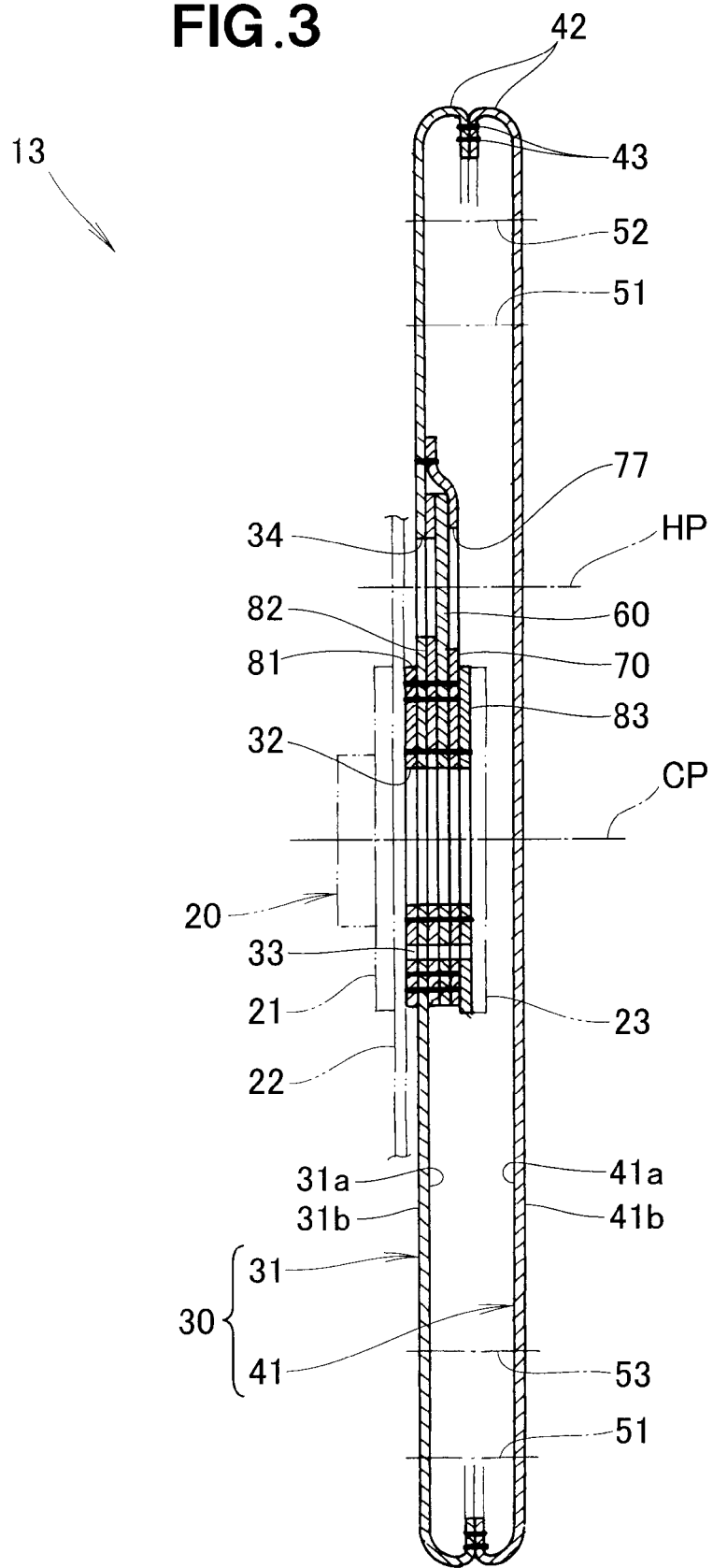
FIG. 3 is a cross-sectional view taken along line 3-3 of FIG. 2.
Figure 4:
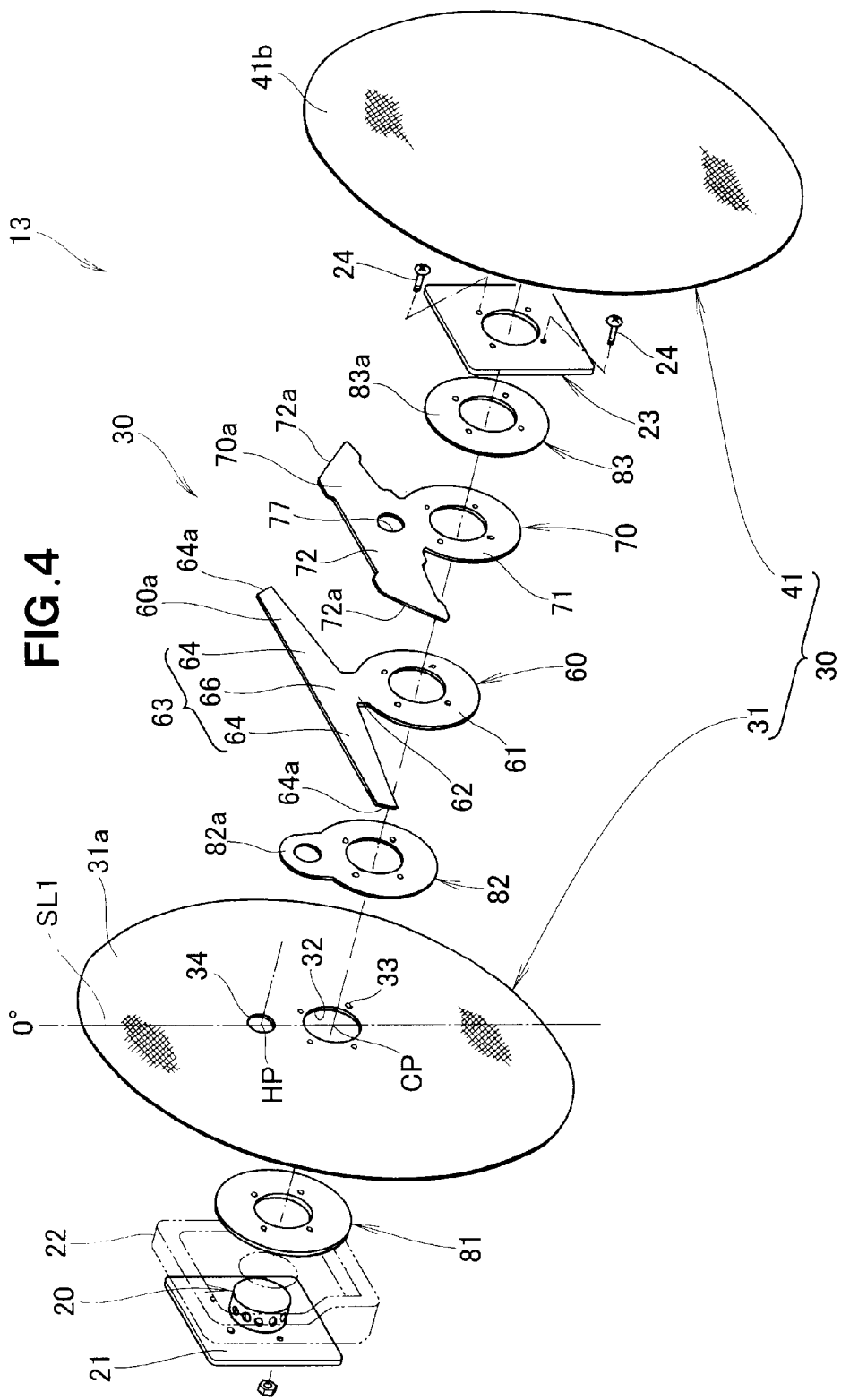
FIG. 4 is an exploded perspective view of the airbag shown in FIG. 2.

The vehicle airbag device 13 has an inflator 20 for generating high-pressure gas, an airbag 30 into which gas generated by the inflator 20 is introduced, and a retainer 22 and a stationary ring 23 that are used for mounting the airbag 30 in the steering wheel 12 (FIG. 1), as shown in FIGS. 2, 3, and 4.

The inflator 20 is mounted on the steering wheel 12 using the retainer 22 and the stationary ring 23, generates high-pressure gas (hereinafter referred to as "gas") when collision energy acts on the vehicle 10 (FIG. 10), and feeds the generated gas into the airbag 30.

The inflator 20 is secured to the steering wheel 12 by inserting bolts 24 into mounting holes formed in a mounting flange 21 of the inflator 20 and into mounting holes of the stationary ring 23 disposed inside the airbag 30, in a state in which the retainer 22 is held between the mounting flange 21 and the stationary ring 23, and fastening the bolt 24 with a nut. The retainer 22 is a member provided to the steering wheel 12.

The airbag 30 is provided with a first base cloth 31 formed in a circular external shape, a second base cloth 41 formed in a circular external shape, a vent hole cover 60 for covering a vent hole 34 (described later) of the first base cloth 31, a cover guide member 70 for suppressing positional displacement of the vent hole cover 60, and first, second, and third reinforcement sheets 81, 82, 83.

The airbag 30 is formed by superimposing the first base cloth 31 and the second base cloth 41 and forming a circular bag unit by joining (integrally sewing the sewn part 43 of the external periphery) the external peripheral parts 42 of the first base cloth and second base cloth, and the airbag can be deployed by introducing gas from the inflator 20.

The first base cloth 31 is a sheet positioned on the vehicle forward side so as to face the steering wheel 12 (FIG. 1) when the airbag 30 has deployed. Formed in the first base cloth 31 are an inflator insertion hole 32 through which the inflator 20 is inserted, a plurality of bolt holes 33 for mounting the inflator 20, and the vent hole 34 for discharging (releasing) gas.

The inflator insertion hole 32 is formed coaxial to the center CP of the first base cloth 31. The inflator insertion hole 32 is a circular through-hole that is capable of guiding the distal end part of the inflator 20 into the airbag 30. The distal end part of the inflator 20 is guided into the airbag 30, whereby the gas generated by the inflator 20 is introduced to the interior of the airbag 30.

The bolt holes 33 are provided about the periphery of the inflator insertion hole 32 and are through-holes through which the bolts 24 can be inserted.

The vent hole 34 is a circular through-hole through which a portion of the gas introduced into the airbag 30 is released to the exterior in order to, e.g., adjust the internal pressure (internal pressure produced by the gas) of the deployed bag 30. The vent hole 34 is disposed in a position HP (hole center HP) offset by a predetermined distance from the center CP of the inflator insertion hole 32.

The second base cloth 41 is formed in substantially the same circular shape as the first base cloth 31 and is a seat positioned on the vehicle rearward side so as to face the passenger when the airbag 30 has deployed.

The airbag 30 is formed by superimposing the first reinforcement sheet 81 on the surface of the first base cloth 31; superimposing the second reinforcement sheet 82, the vent hole cover 60, the cover guide member 70, and the third reinforcement sheet 83 in the stated order on the back surface of the first base cloth 31; and sewing the periphery of the inflator insertion hole 32 so that the each of the members form a single unit.

The first and second base cloths 31, 41, the vent hole cover 60, the cover guide member 70, and the first, second, and third reinforcement sheets 81, 82, 83 are all formed with the same materials and are formed using a cloth (or a flexible panel) having the same thickness.

The front surface and back surface of these cloths have different friction characteristics (frictional resistance). For example, the friction characteristics of the front and back side are made different by having a silicon coating applied to only one side of the cloths. The first base cloth 31 and the vent hole cover 60, and the vent hole cover 60 and the cover guide member 70 are arranged so that the front surface and the back surface of each are different from each other.

For example, the frictional resistance of the back surface (the surface facing the second base cloth 41) of the first base cloth 31 is greater than that of the front surface. The surface of the vent hole cover 60 having the lesser frictional resistance faces the back surface (the surface having the lesser frictional resistance) of the first base cloth 31. The surface of the cover guide member 70 having the lesser frictional resistance faces the surface of the vent hole cover 60 having the larger frictional resistance.

The first reinforcement sheet 81, the second reinforcement sheet 82, the vent hole cover 60, the cover guide member 70, and the third reinforcement sheet 83 have bolt holes formed coaxial to the plurality of bolt holes 33 of the first base cloth 31. The first reinforcement sheet 81, the first base cloth 31, the second reinforcement sheet 82, the vent hole cover 60, the cover guide member 70, and the third reinforcement sheet 83, which have been sewn together as a single unit, are sandwiched between the inflator 20 (specifically, the mounting flange 21) and the stationary ring 23. In this state, the bolt holes of the mounting flange 21 and the bolt holes of the stationary ring 23 are arranged to be coaxial to the plurality of bolt holes 33 of the first base cloth 31.

The airbag 30 is mounted on the mounting flange 21 of the inflator 20 by inserting and threadably engaging the bolts 24 in the bolt holes 33 and other bolt holes. The airbag 30 is supported by the retainer 22 via the mounting flange 21 by mounting the mounting flange 21 on the retainer 22 inside the steering wheel 12.

Figure 5:
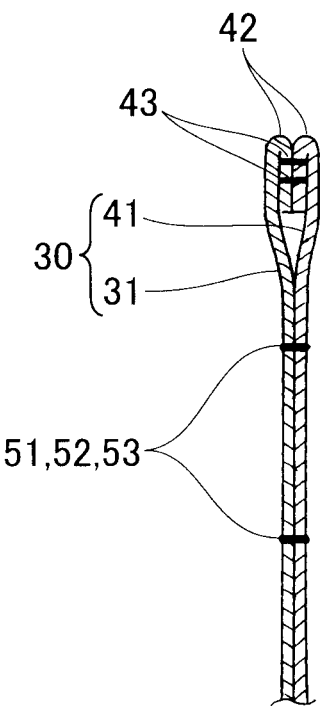
FIG. 5 is a cross-sectional view showing breakable sewn parts of the airbag of FIG. 2.

The airbag 30 is sewn together using a plurality of, e.g., three sewn parts 51, 52, 53 in which the first base cloth 31 and the second base cloth 41 (FIG. 4) are superimposed as shown in FIGS. 2 and 5. The sewn parts 51, 52, 53 are sewn together in a spiral fashion from each sewing start point 54 near the center CP of the inflator insertion hole 32 to the sewing end point 55 of the external peripheral part 42.

The sewing start point 54 positioned inward in the radial direction extends toward the center CP of the airbag bag unit 30. Accordingly, stress at the sewing start point 54 can be concentrated by the internal pressure of the airbag 30.

The breakable sewn parts 51, 52, 53 all have the same configuration, the length from the sewing start point 54 to the sewing end point 55 is the same, and the breakable sewn parts are arranged mutually offset in phase by 120°. In other words, the breakable sewn parts 51, 52, 53 all have the same distance from the center CP of the inflator insertion hole 32 to the sewing start point 54, and all have the same distance from the center CP to the sewing end point 55.

In FIG. 2, the direction in which the hole center HP is positioned is 0° in relation to the center CP of the inflator insertion hole 32, and the angle increases in the clockwise direction of the drawing. The reference line SL1 is a line that extends from the center CP of the inflator insertion hole 32 toward the 0° direction along the center of the hole center HP. The orthogonal reference line SL2 is a straight line that is orthogonal to the reference line SL1 on the surface of the first base cloth 31.

The first breakable sewn part 51 has the direction 0° set as the sewing start point 54, is arcuately sewn in small increments in the peripheral direction while slightly extending outward in the radial direction from the sewing start point 54, and is thereafter sewn in a spiral shape to a distance commensurate with the direction 240° in the counterclockwise direction of the drawing. The direction 120° is set as the sewing end point 55. The sewing start point 54 is positioned further outward in the radial direction from the vent hole 34. The sewing end point 55 is formed just in front of the external peripheral edge of the base cloths 31, 41, and gas is thereby allowed to flow between the end point and external peripheral edge.

Similarly, the second breakable sewn part 52 has the 120° direction set as the sewing start point 54 and is sewn in a spiral shape to a distance commensurate with the 240° direction in the counterclockwise direction of the drawing while following the external periphery of the first breakable sewn part 51. The 240° direction is set as the sewing end point 55.

Similarly, the third breakable sewn parts 53 has the 240° direction set as the sewing start point 54 and is sewn in a spiral shape to a distance commensurate with the 240° direction in the counterclockwise direction of the drawing while following the external periphery of the second breakable sewn part 52. The 0° direction is set as the sewing end point 55.

The breakable sewn parts 51, 52, 53 are set at a distance from each other, a predetermined spacing being provided in the radial direction. The spacing gradually narrows in progression from the sewing start point 54 to the sewing end point 55.

The breakable sewn parts 51, 52, 53 are sequentially broken from the sewing start points 54 toward the sewing end points 55 on the external peripheral side due to the internal pressure of the bag generated when the airbag 30 deploys. The volume of the airbag 30 increases when the breakable sewn parts 51, 52, 53 break, and the internal pressure of the airbag 30 can be adjusted.

Figure 6:
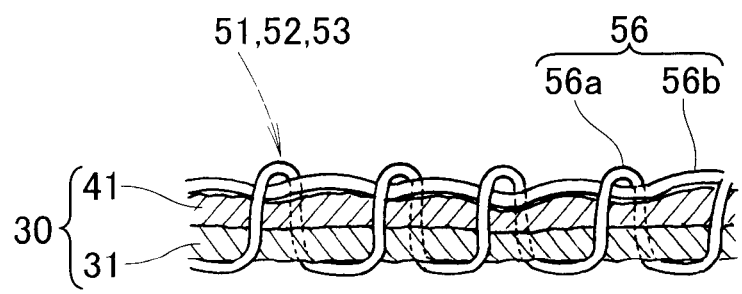
FIG. 6 is a cross-sectional view taken along line 6-6 of FIG. 2.

The sewing yarn 56 of the breakable sewn parts 51, 52, 53 sequentially breaks from near the center of the two base cloths 31, 41 toward the external periphery, whereby the first and second base cloths 31, 41 are separated, as shown in FIG. 6.

The sewing yarn 56 is composed of a first yarn 56a and a second yarn 56b. The first yarn 56a is composed of a weak yarn, e.g., a filament yarn that has not been subjected to a coloring process and that has a tensile strength (breaking load, which is the force required for pulling and breaking) of 20 N to 60 N, so as to break due to the bag being at or above a predetermined internal pressure. On the other hand, the second yarn 56b is a thread for guiding the first yarn 56a in the sewing direction of the breakable sewn parts 51, 52, 53, and has a tensile strength that is set to be greater than that of the first yarn 56a so as prevent breaking due to the internal pressure of the bag when the airbag bag unit 30 is deployed.

Accordingly, the first yarn 56a breaks first due to the tensile force that acts on the first yarn due to the bag being at or above a predetermined internal pressure. The first, yarn 56a is guided by the second yarn 56b in the sewing direction. For this reason, the breaking strength of the first yarn 56a is kept substantially constant in any location of the breakable sewn parts 51, 52, 53. Therefore, the first yarn 56a is unerringly broken in a sequential fashion from the center part toward the external peripheral part of the first and second base cloths 31, 41.

The airbag 30 can be smoothly deployed with better timing by gas fed from the inflator 20. Accordingly, variation in the internal pressure of the bag can be more suitably controlled. The internal pressure characteristics of the airbag 30 can be made more accurate after the inflator 20 has started feeding gas to the airbag 30.

The first yarn 56a is composed of a filament yarn, which is a continuous long fiber, and has no twisting or substantially no twisting. Since there is no twisting, variability in the breaking load is low in the lengthwise direction of the yarn. Therefore, the first yarn 56a is unerringly broken in a sequential fashion from the center part toward the external peripheral part of the first and second base cloths 31, 41 due to the predetermined internal pressure or greater of the bag.

Figure 7:
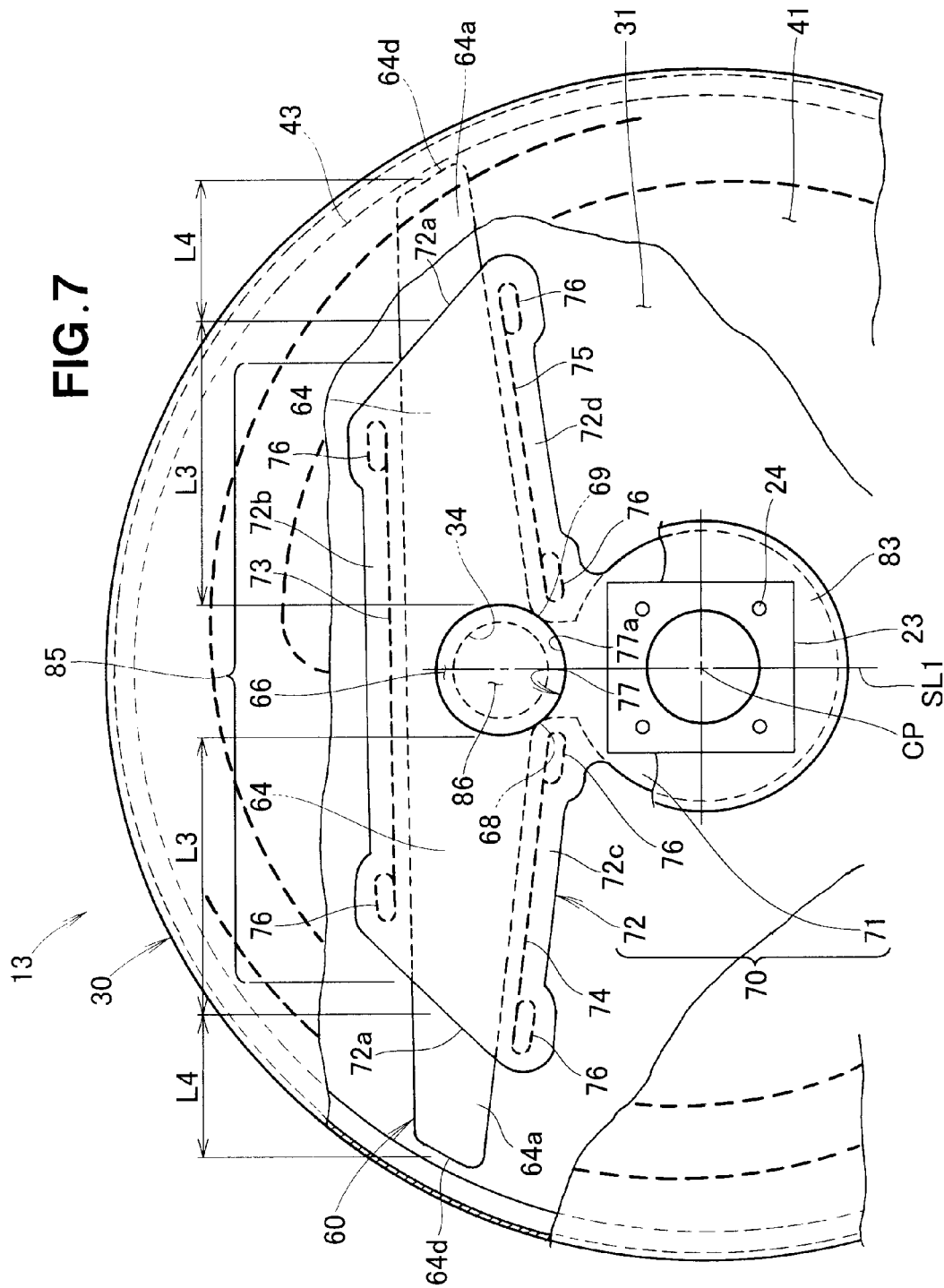
FIG. 7 is a front view of a vent hole cover and a cover guide member.
Figure 8:
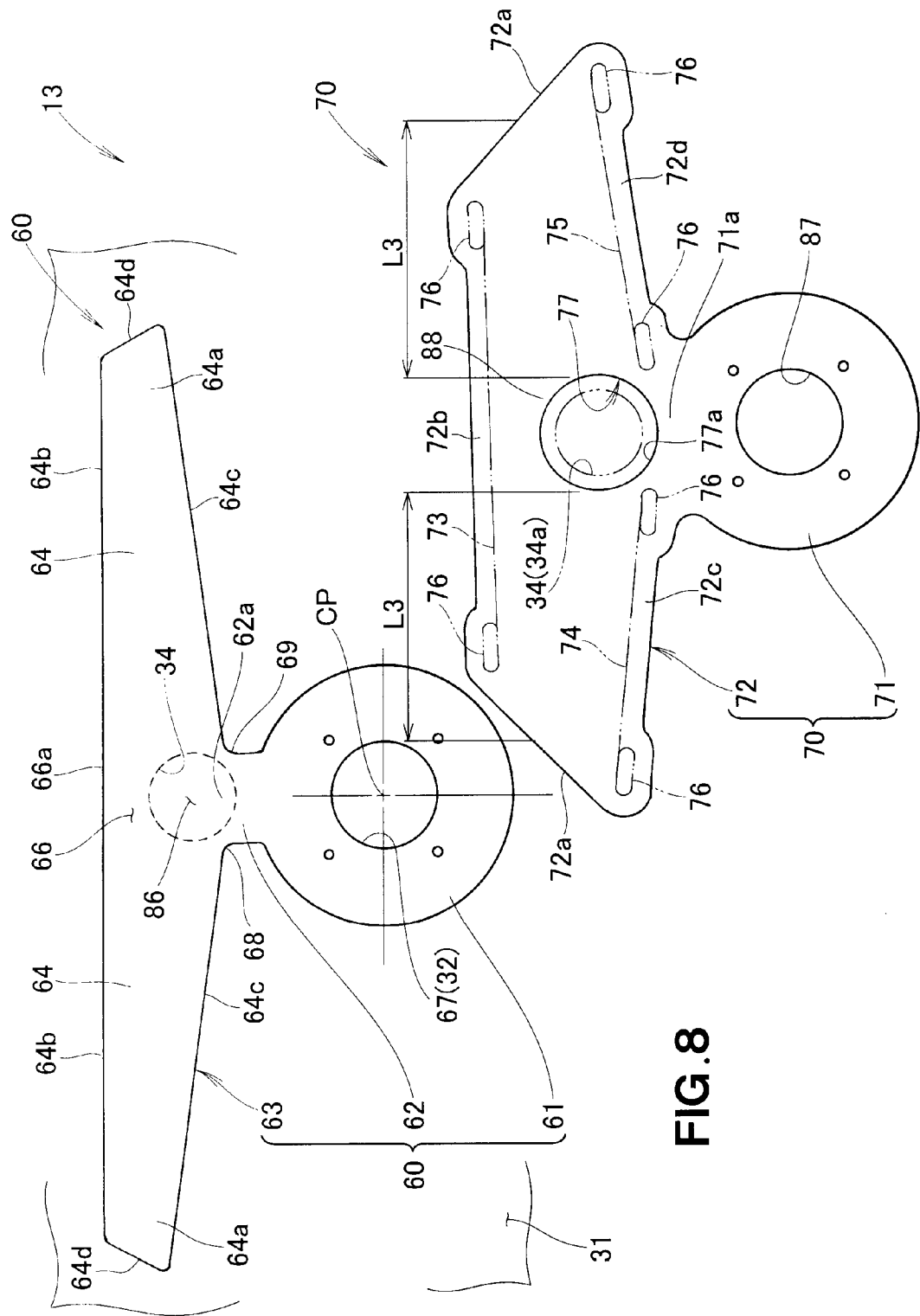
FIG. 8 is an exploded front view of the vent hole cover and the cover guide member of FIG. 7.

The vent hole cover 60 is a flap in the form of a sheet that covers the vent hole 34, as shown in FIGS. 7 and 8, whereby the vent hole 34 can be blocked until the internal pressure of the airbag 30 reaches a predetermined value. The airbag 30 can move so as to open the vent hole 34 due to the internal pressure of the bag when the internal pressure has reached a predetermined value.

The vent hole cover 60 is composed of an annular cover base part 61 mounted on the first ground fabric 31 using bolts 24, a vertical strip-shaped extension part 62 extended in the radial direction from the cover base part 61 toward the vent hole 34, and a horizontal strip-shaped orthogonal part 63 provided to the distal end of the extension part 62. The extension part 62 and the orthogonal part 63 of the vent hole cover 60 form substantially a T-shape, and the intersecting part 66 of the extension part 62 and the orthogonal part 63 is formed so as to correspond to the vent hole 34. The vent hole cover 60 is formed asymmetrical to the reference line SL1 shown in FIG. 2.

The cover base part 61 is an annular area disposed coaxial to the center CP of the inflator insertion hole 32 (see FIG. 4) and has a through-hole 67 that is disposed coaxial to and has substantially the same diameter as the inflator insertion hole 32. The cover base part 61 is sewn to the first base cloth 31 around the periphery of the inflator insertion hole 32.

The extension part 62 is a vertical strip-shaped area extended at a predetermined width from the cover base part 61 (i.e., the inflator 20 shown in FIG. 4) toward the vent hole 34 along the back surface of the first base cloth 31.

The orthogonal part 63 is a horizontal strip-shaped area extended from the distal end 62a of the extension part 62 in the direction substantially orthogonal (i.e., the left/right directions) to the extension part 62 along the back surface of the first base cloth 31. The orthogonal part 63 is provided with an intersecting part 66 disposed above the extension part 62, a left strip-shaped part 64 extended substantially horizontal from the intersecting part 66 to the leftward direction, and a right strip-shaped part 64 extended substantially horizontal from the intersecting part 66 in the rightward direction.

The upper edges 66a, 64b, 64b of the left and right strip-shaped part 64 and the intersecting part 66 extend in a continuous manner on the same horizontal line. In other words, the upper edge of the orthogonal part 63 is formed substantially parallel to the orthogonal reference line SL2 shown in FIG. 2.

The lower edge 64c of the left strip-shaped part 64 extends in a tapered shape with a rising slope from the intersecting part 66 toward the left distal end. The lower edge 64c of the right strip-shaped part 64 extends in a tapered shape with a rising slope from the intersecting part 66 toward the right distal end.

The distal end 64d of the left strip-shaped part 64 is formed in slope shape along the sewn part 43 of the airbag 30. The distal end 64d of the right strip-shaped part 64 is formed in a slope shape along the sewn part 43 of the airbag 30.

The distal end parts (i.e., the two end parts of the orthogonal part 63) 64a, 64a of the left and right strip-shaped parts 64, 64 are exposed through the cover guide member 70 and are sewn to the first and second base cloths 31, 41 using the breakable sewn parts 51, 52, 53. In other words, the distal end parts 64a, 64a of the left and right strip-shaped parts 64, 64 are "exposed areas."

Figure 9:
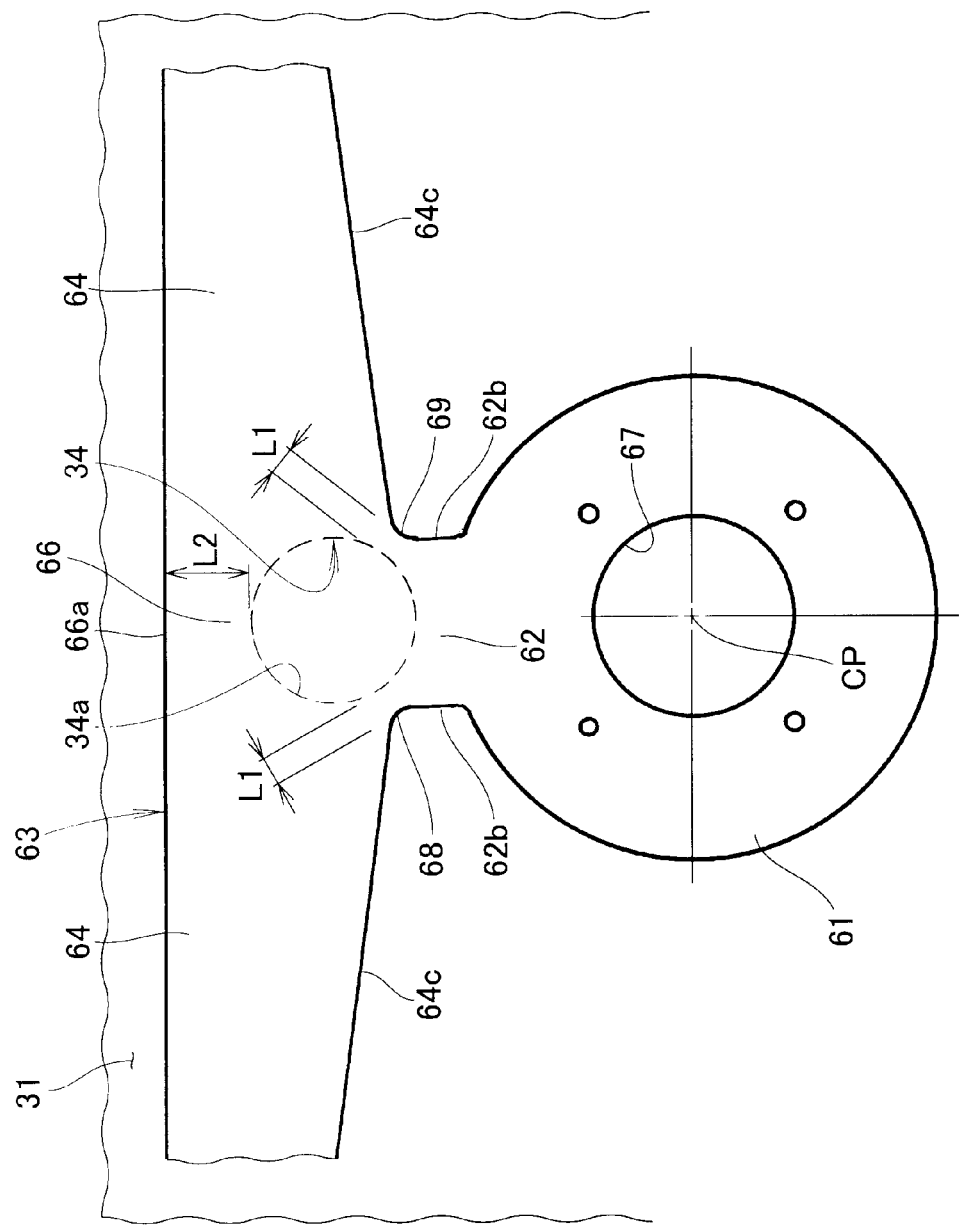
FIG. 9 is an enlarged view showing a portion of the vent hole cover of FIG. 6.

A concave left corner edge 68 is formed in an area in which the left-side edge 62b of the extension part 62 and the lower edge 64c of the left strip-shaped part 64 intersect, as shown in FIG. 9. The left corner distance from the left corner edge 68 to the peripheral edge 34a of the vent hole 34 is set to be L1.

A concave right corner edge 69 is formed in an area in which the right-side edge 62b of the extension part 62 and the lower edge 64c of the right strip-shaped part 64. The right corner distance from the right corner edge 69 to the peripheral edge 34a of the vent hole 34 is set to be L1 in the same manner as the left corner distance.

Furthermore, the upper edge distance from the upper edge (other areas of the vent hole cover 60) 66a of the intersecting part 66 to the peripheral edge 34a of the vent hole 34 is set to be L2. The left corner distance L1 and the right corner distance L1 are set to be less than the upper edge distance L2.

The left corner edge 68 and the right corner edge 69 are supported by the extension part 62. Therefore, it is possible that the left corner edge 68 and the right corner edge 69 are obstructed from being drawn in by the extension part 62 when the internal pressure of the airbag 30 draws the left corner edge 68 and the right corner edge 69 into vent hole 34.

When the left corner edge 68 and the right corner edge 69 are obstructed from being drawn in, it is difficult for the entire region of the intersecting part 66 to be uniformly drawn into the vent hole 34. Accordingly, the shape of the vent hole cover 60 becomes irregular, and it is possible that the rate at which gas flows from the gap between the vent hole cover 60 and the vent hole 34 cannot stabilize.

In view of this situation, the left corner distance L1 and the right corner distance L1 are set to be less than the upper edge distance L2. Accordingly, when a gap is formed between the vent hole 34 and the upper edge 66a of the intersecting part 66, a gap can be suitably formed between the left corner edge 68 and the vent hole 34, and a gap can be suitably formed between the right corner edge 69 and the vent hole 34. Therefore, deformation of the intersecting part 66 is reduced, gas is favorably released to the exterior from the gap thus formed, and the internal pressure of the airbag 30 is advantageously adjusted.

Referring to FIGS. 7 and 8 again, the cover guide member 70 is a sheet for covering a target cover area 85 in order to restrict the positional displacement of the intersecting part 66 of the vent hole cover 60 from the vent hole 34, and for allowing the vent hole cover 60 to move so as to open the vent hole 34.

The target cover area 85 of the vent hole cover 60 is an area that excludes the distal end part (exposed area) 64a of the left strip-shaped part 64 and the distal end part (exposed area) 64a of the right strip-shaped part 64 from the vent hole cover 60, and includes the area (hereinafter referred to as "hole-closing area") 86 that corresponds to the vent hole 34 substantially in the center. The hole-closing area 86 is formed in the intersecting part 66.

The cover guide member 70 for covering the target cover area 85 is composed of an annular guide base part 71 mounted on the first base cloth 31 using the bolts 24 via the bolt holes 33 (FIG. 4), and a horizontal strip-shaped guide part 72 provided to the upper end of the guide base part 71. The cover guide member 70 is formed asymmetrical to the reference line SL1 shown in FIG. 2.

The guide base part 71 is an annular area provided coaxial to the center CP of the inflator insertion hole 32 (see FIG. 4) in the same manner as the cover base part 61 of the vent hole cover 60, and is provided with a through-hole 87 disposed coaxial to and having substantially the same diameter as the inflator insertion hole 32. The guide base part 71 is sewn to the first base cloth 31 about the periphery of the inflator insertion hole 32 so as to form a single unit.

The guide base part 71 can be extended to the vicinity of the inflator 20 by sewing the guide base part 71 about the periphery of the inflator insertion hole 32. The relative positions of the inflator 20 and the cover guide member 70 can thereby be readily adjusted and manufacturing precision is improved.

The guide part 72 is a horizontal strip-shaped area extending from the upper end 71a of the guide base part 71 in the lateral direction along the back surface of the first base cloth 31. The guide part 72 is superimposed on the orthogonal part 63 of the vent hole cover 60, an upper end part 72b is sewn to the first base cloth 31 using a first sewn part 73, a left lower end part 72c is sewn to the first base cloth 31 using a second sewn part 74, and a right lower end part 72d is sewn to the first base cloth 31 using a third sewn part 75. The guide part 72 is extended to and arranged in the vicinity of the breakable sewn parts 51, 52, 53 (FIG. 2), and the left and right distal ends 72a, 72a are open without being sewn to the first base cloth 31.

The left strip-shaped part 64 is arranged between the second sewn part 74 and the left-side area of the first sewn part 73, the distal end (exposed area) 64a of the left strip-shaped part 64 protruding from the left distal end 72a to the exterior of the guide part 72. The right strip-shaped part 64 is arranged between the third sewn part 75 and the right-side area 73a of the first sewn part 73, the distal end (exposed area) 64a of the right strip-shaped part 64 protruding from the right distal end 72a to the exterior of the guide part 72

In other words, the guide part 72 extends toward the left and right sides (the two sides) of the intersecting part 66 so as to face the orthogonal part 63 (left and right strip-shaped parts 64). The guide part 72 has an opening 77 that is circularly formed in an area 88 that corresponds to the hole-closing area 86.

The peripheral edge 77a of the opening 77 substantially matches the concave left corner edge 68 and the concave right corner edge 69 (FIG. 7). Accordingly, the concave left corner edge 68 and the concave right corner edge 69 can be configured so as to not be covered by the cover guide member 70. The opening 77 is formed coaxial to the vent hole 34.

First, second, and third breakable sewn parts 73, 74, 75 are guide parts for restricting the movement (sliding) direction of the orthogonal part 63 of the vent hole cover 60. Accordingly, when the orthogonal part 63 of the vent hole cover 60 moves (slides), the orthogonal part 63 is guided by the three breakable sewn parts 73, 74, 75 for guiding, and the movement direction of the orthogonal part 63 is restricted.

The first sewn part 73 is sewn from the vicinity of the left distal end 72a to the vicinity of the right distal end 72a along the upper end part 72b of the guide part 72. In other words, the first sewn part 73 is sewn substantially parallel to the upper edge of the guide part 72.

The second sewn part 74 is sewn from the vicinity of the left distal end 72a to the vicinity of the left-side edge 62b (FIG. 9) of the extension part 62 along the left lower end part 72c of the guide part 72. In other words, the second sewn part 74 is sewn so as to slope in a down incline from the vicinity of the left distal end 72a to the vicinity of the left-side edge 62b so as to approach the inflator insertion hole 32.

The third sewn part 75 is sewn from the vicinity of the right distal end 72a to the vicinity of the right-side edge 62b of the extension part 62 along the right lower end part 72d of the guide part 72. In other words, the third sewn part 75 is sewn so as to slope in a down incline from the vicinity of the right distal end 72a to the vicinity of the right-side edge 62b so as to approach the inflator insertion hole 32.

The sewing ends of the two sides of the first to third breakable sewn parts 73 to 75 each have stress concentration-reducing portions 76, 76. The stress concentration-reducing portions 76, 76 of the first sewn part 73 are formed above the first sewn part 73. The stress concentration-reducing portions 76, 76 of the second and third breakable sewn parts 74, 75 are formed below the second and third breakable sewn parts 74, 75, respectively.

The stress concentration-reducing portions 76, 76 of the first to third breakable sewn parts 73 to 75 are sewn in a loop shape in an exiting direction from the vent hole cover 60. In the present example, the stress concentration-reducing portions 76, 76 are formed substantially in an elliptical shape; i.e., the shape of a curve, so as to follow the first to third breakable sewn parts 73 to 75. The first to third breakable sewn parts 73 to 75 can thereby be prevented from breaking away from the stress concentration-reducing portions 76, 76, allowing the vent hole cover 60 to move (slide) in a smooth fashion.

In this manner, the guide part 72 of the cover guide member 70 extends so as to face the orthogonal part 63 (left and right strip-shaped parts 64), the upper end part 72b is sewn to the first base cloth 31 using the first sewn part 73, and the left and right lower end parts 72c, 72d are sewn to the first base cloth 31 using the second and third sewn parts 74, 75. Therefore, the cover guide member 70 can restrict the target cover area 85 of the vent hole cover 60 from becoming positionally displaced from the vent hole 34.

In particular, the intersecting part 66 that corresponds to the vent hole 34 (specifically, the area of the intersecting part 66 that excludes the location that corresponds to the opening 77) can be covered by the cover guide member 70. Therefore, the vent hole cover 60 can be reliably prevented by the cover guide member 70 from becoming positionally displaced from the vent hole 34.

Furthermore, the opening 77 is formed in an area of the cover guide member 70 that corresponds to the hole-closing area 86. Therefore, the internal pressure of the airbag 30 can be made to act on the hole-closing area 86 via the opening 77. The orthogonal part 63 of the vent hole cover 60 can thereby be made to move due to the bag internal pressure so as to cover the vent hole 34 when the internal pressure of the bag has increased to a predetermined internal pressure. Therefore, the vent hole cover 60 is pressed into the vent hole 34, the vent hole cover 60 at the periphery of the vent hole 34 forms bunched wrinkles, a gap is formed between the vent hole cover 60 and the first base cloth 31, and the gap is placed in communication with the vent hole 34. In this manner, gas is released to the exterior from the vent hole via the gap, whereby the internal pressure of the airbag 30 can be suitably adjusted.

The guide part 72 has a left distance dimension from the left distal end 72a of the guide part 72 to the vent hole 34 that is set to L3, and a distance dimension from the right distal end 72a of the guide part 72 to the vent hole 34 that is set to L3.

On the other hand, the vent hole cover 60 has a left length dimension of the exposed area (i.e., distal end part) 64a from the left distal end 72a of the guide part 72 to the distal end 64d of the left strip-shaped part 64 that is set to L4, and a right length dimension of the exposed area (i.e., distal end part) 64a from the right distal end 72a of the guide part 72 to the distal end 64d of the right strip-shaped part 64 that is set to L4

The left distance dimension L3 is set to be greater than the left length dimension L4, and the right distance dimension L3 is set to be greater than the right length dimension L4. In the case that the exposed area (i.e., distal end part) 64a of the left strip-shaped part 64 is folded back toward the opening 77, the distal end part 64a thus folded back can be prevented from reaching the opening 77 and being drawn into the opening 77. The arrangement is the same for the right side as well. The vent hole cover 60 can thereby be reliably moved and the vent hole 34 opened.

Furthermore, the guide part 72 is formed so that the right and left distal ends 72a of the guide part 72 each slope toward the orthogonal part 63 of the vent hole cover 60. The exposed area (i.e., distal end part) 64a of the left strip-shaped part 64 is folded back in a state sloping in the movement direction of the distal end 72a. The arrangement is the same for the right side as well. The frictional force generated in the area folded back to the left side can be kept low in the case that the area folded back to the left side makes contact with the left distal end 72a. The arrangement is the same for the right side as well. Therefore, the vent hole cover 60 can be smoothly moved so as to open the vent hole 34.

Next, an example deploying the airbag 30 of the vehicle airbag device 13 is described with reference to FIGS. 10 through 13.

Figure 10:
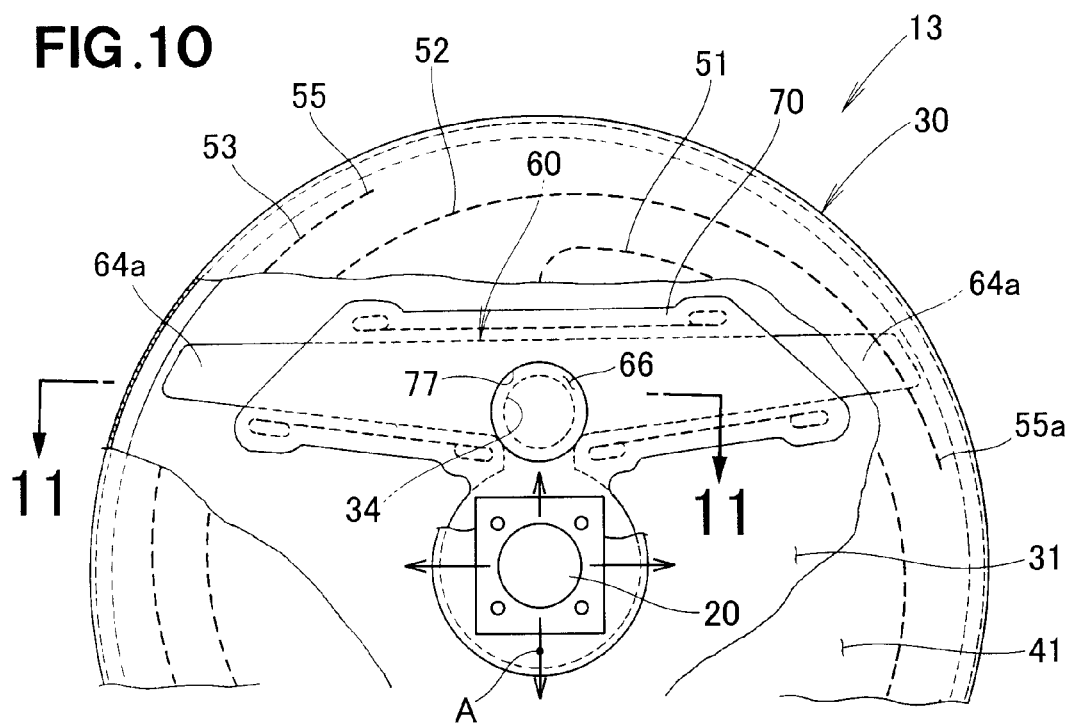
FIG. 10 is a schematic view showing the airbag deployed halfway.

In FIG. 10, gas inside the airbag 30 is introduced from the inflator 20 in the manner indicated by the arrow A when collision energy exceeding a predetermined value has acted on the vehicle 10 (FIG. 1). The airbag 30 begins to deploy when gas is introduced into the airbag 30.

Figure 11:
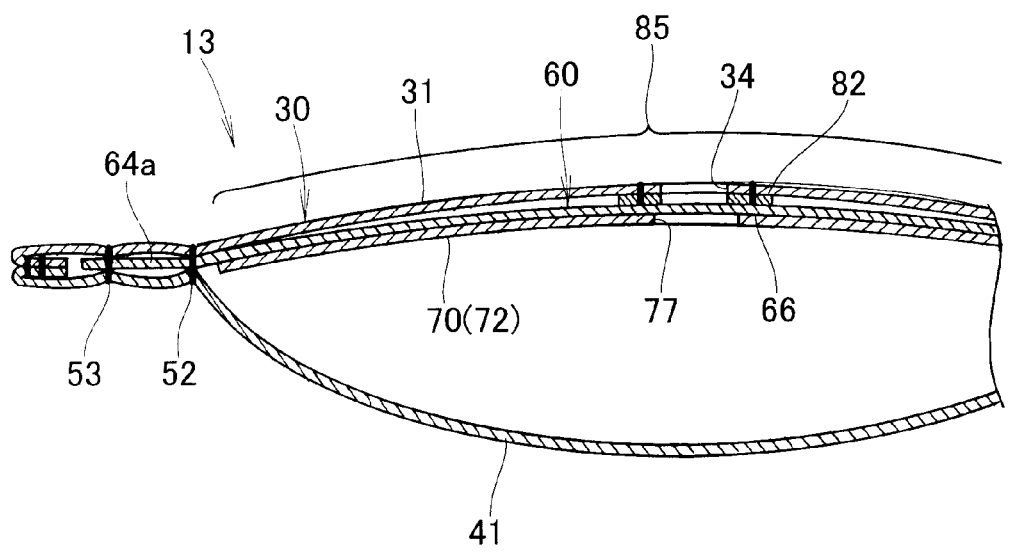
FIG. 11 is a cross-sectional view taken along line 11-11 of FIG. 10.

In FIG. 11, the first and second base cloths 31, 41 are sewn into a single unit to form an airbag 30 using the breakable sewn parts 51 to 53 (the second breakable sewn part 52 is shown in FIG. 10). Accordingly, the distal ends 64a, 64a (the right-side distal end 64a is shown in FIG. 10) of the left and right sides of the vent hole cover 60 are restrained by the first and second base cloths 31, 41 with the aid of the breakable sewn parts 51 to 53.

The target cover area 85 of the vent hole cover 60 is restricted by the cover guide member 70 from becoming positionally displaced from the vent hole 34. The intersecting part 66 (specifically, the area of the intersecting part 66 excluding the location that corresponds to the opening 77) that corresponds to the vent hole 34 is covered by the cover guide member 70.

In this manner, the first base cloth 31 and the second ground fabric 41 are sewn together using the breakable sewn parts 51 to 53, and gas is prevented from being released to the exterior from the vent hole 34, whereby the expansion capacity of the airbag 30 is restricted in the initial stage of deployment. Therefore, the airbag 30 rapidly reaches a homogeneous film pressure distribution within the capacity restricted between the center part and the breakable sewn parts 51 to 53.

At this point, in the case that the passenger is present in a position near the steering wheel 12 (FIG. 1) and begins to make contact with the airbag 30, the rate at which the pressure inside the bag increases is restricted and the passenger can be softly restrained as the breakage of the breakable sewn parts 51 to 53 progresses together with the increase in the internal pressure of the bag.

On the other hand, even when the passenger is not in contact with the airbag 30, the breakable sewn parts 51 to 53 break in sequential fashion from the sewing start point 54 to the sewing end point 55 in accordance with the increase in the bag internal pressure due to the introduction of gas from the inflator 20. Accordingly, the airbag 30 gradually increases in capacity and deploys so as to achieve a predetermined form while a suitable bag internal pressure is maintained.

Figure 12A:
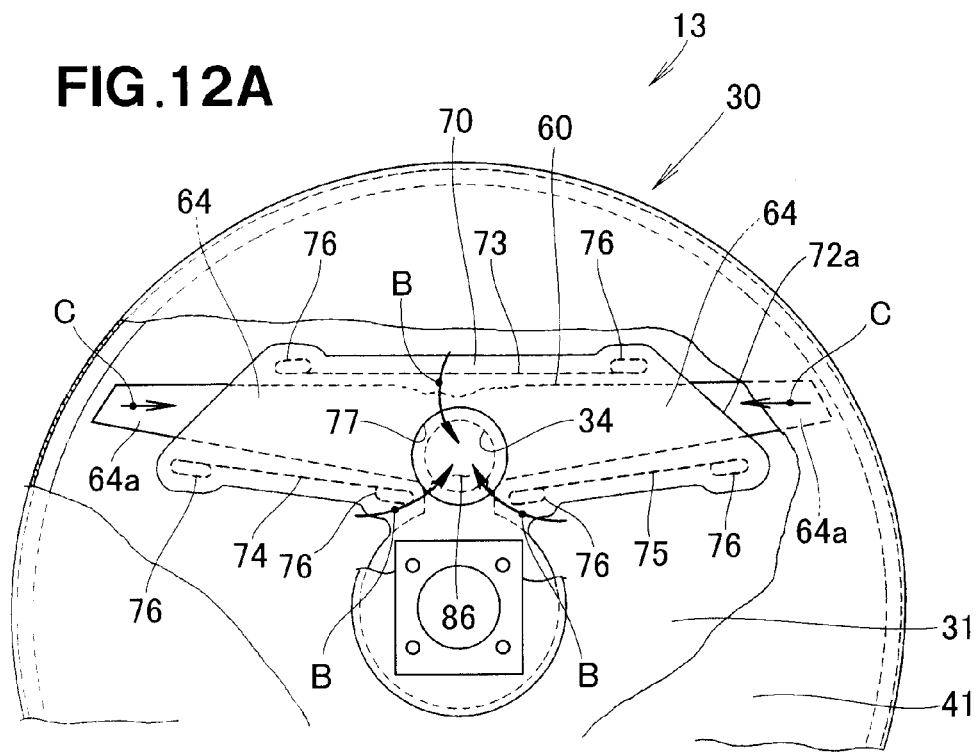
FIG. 12A is a schematic view showing the airbag fully deployed.
Figure 12B:
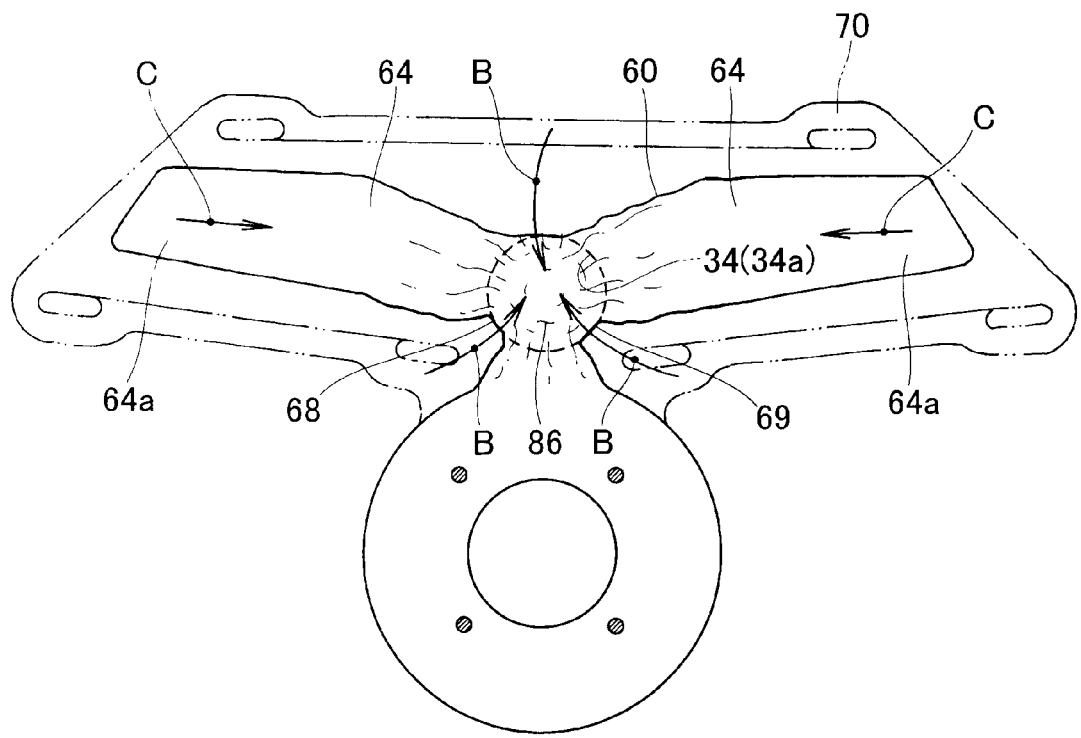
FIG. 12B is a schematic view showing a state of the vent hole cover of FIG. 12A.

FIGS. 12A and 12B show the airbag 30 in a deployed state. In FIG. 12A, the breakable sewn parts 51 to 53 (FIG. 10) are broken, whereby the airbag 30 can deploy in a predetermined shape while the internal pressure of the airbag 30 is suitably maintained.

The restraint of the left and right distal end parts 64a, 64a of the vent hole cover 60 is released when the breakable sewn parts 51 to 53 break. On the other hand, the internal pressure of the airbag 30 acts on the hole-closing area 86 of the vent hole cover 60 via the opening 77 of the cover guide member 70 in the manner indicated by the arrow B. Therefore, the breakable sewn parts 51 to 53 break and the restraint of the left and right distal end parts 64a, 64a is released, whereby the left and right strip-shaped parts 64, 64 of the vent hole cover 60 move (are drawn) in the manner indicated by the arrow C.

In FIG. 12B, the left and right strip-shaped parts 64, 64 move (are drawn) in the manner indicated by the arrow C, whereby the hole-closing area 86 is pushed from the vent hole 34 to the exterior of the airbag 30.

The left corner distance L1 and the right corner distance L1 are set to be less than the upper edge distance L2, as shown in FIG. 9. Therefore, when a gap is formed between the vent hole 34 and the upper edge 66a of the intersecting part 66, deformation of the intersecting part 66 is restricted, a gap can be suitably formed between the left corner edge 68 and the vent hole 34, and a gap can be suitably formed between the right corner edge 69 and the vent hole 34.

Furthermore, the peripheral edge 77a of the opening 77 substantially matches the concave left corner edge 68 and the concave right corner edge 69, as shown in FIG. 7. Therefore, the concave left corner edge 68 and the concave right corner edge 69 can be configured so as to not be covered by the cover guide member 70.

FIG. 13 shows an example in which gas is discharged from the vent hole 34 of the airbag 30 to the exterior.

A gap can be suitably formed between the vent hole 34 and the left and right corner edges (38, 69, and the left and right corner edges 68, 69 are configured so as to not be covered by the cover guide member 70, as shown in FIG. 12B. Excess gas inside the airbag 30 can be suitably discharged from the gap between the vent hole 34 and the left and right corner edges 68, 69 to the exterior in the manner indicated by the arrow D, as shown in FIG. 11. An excessive increase in the internal pressure of the airbag 30 can be prevented and the bag internal pressure can be suitably adjusted even after the airbag 30 has reached its maximum shape by having excess gas suitably released to the exterior.

It is possible that the distal ends (exposed areas) 64a, 64a of the left and right strip-shaped parts 64, 64 will fold back when the left and right strip-shaped parts 64, 64 move (are drawn) in the manner indicated by the arrow C, as shown in FIG. 12A. In the case that the distal end 64a is folded back toward the opening 77 in the manner described above, the distal end 64a thus folded back can be prevented from reaching the opening 77 and being drawn into the opening 77, and the frictional force generated when the distal end 64a makes contact with the distal end 72a of the cover guide member 70 can be kept low. Therefore, the vent hole cover 60 can be smoothly moved so as to open the vent hole 34.

FIGS. 14(a) and 14(b) show the stress concentration-reducing portion of the cover guide member shown in FIG. 8. The sewing ends of the two sides of the first to third breakable sewn parts 73 to 75 each have stress concentration-reducing portions 76, 76.

The stress concentration-reducing portions 76, 76 are portions furthermore sewn in a loop shape in the exiting direction of the vent hole cover 60 at the sewing ends of the guiding sewn parts 73 to 75, as shown in FIGS. 7, 14(a), and 14(b). In the present example, the stress concentration-reducing portions 76, 76 are formed substantially in the shape of a long thin ellipsis as viewed from the front in the direction that follows the guiding sewn parts 73 to 75. Accordingly, the sewing ends present an arcuate shape.

The first guiding sewn part 73 is described as an example, as shown in FIG. 14(a). The stress concentration-reducing portion 76 is composed of a first arcuate part 76a sewn in a semi-arcuate shape toward the direction away from the vent hole cover 60 in the end part of the main sewn part 73a, a first rectilinear part 76b rectilinearly sewn from the first arcuate part 76a, a second arcuate part 76c sewn in a semi-arcuate shape from the first rectilinear part 76b toward the direction approaching from the vent hole cover 60, and a second rectilinear part 76d rectilinearly sewn from the second arcuate part 76c so as to follow the main sewn part 73a.

The stress concentration-reducing portion 76 formed on the second and third guiding sewn parts 74, 75 is also the same as the stress concentration-reducing portion 76 of the first guiding sewn part 73, as shown in FIG. 14(b). The second and third sewn parts 74, 75 also have main sewn parts 74a, 75a, respectively.

For purposes of comparison with the present example, FIG. 15(a) shows a cover guide member that does not have a stress concentration-reducing portion, and FIG. 15(b) shows the cover guide member of the present example, which has a stress concentration-reducing portion 76.

The airbag 300 shown in FIG. 15(a) is provided with a vent hole cover 301 for covering a vent hole 309, and a cover guide member 302 for guiding the vent hole cover 301. The cover guide member 302 is sewn to a base cloth (not shown) of the airbag 300 using first to third guiding sewn parts 303 to 305.

Since the first to third guiding sewn parts 303 to 305 are rectilinearly formed, gas from an inflator (not shown) causes shear stress to act on the sewing end part 306 of the first guiding sewn part 303 and on the sewing end parts 307, 307 of the second guiding sewn part 304 when the vent hole cover 301 moves in relation to the cover guide member 302, and the cover guide member 302 is likely to peel away from the base cloth of the airbag 300.

Furthermore, the sewing end part 306 of the first guiding sewn part 303 and sewing end parts 307, 307 of the second guiding sewn part 304 are sewn in approximate point contact with the cover guide member 302. Therefore, vent hole cover 301 sometimes acts so as to bite into the cover guide member 302, and it is possible that smooth movement of the vent hole cover 301 will be obstructed.

In FIG. 15(b), the airbag 30 of the present example is deployed by gas from the inflator 20, and is provided with a vent hole 34 for preventing an increase in the internal pressure, as shown in FIGS. 2 and 3. The airbag 30 is provided with a vent hole cover 60 for covering the vent hole 34, and a cover guide member 70 for restricting or guiding the movement of the vent hole cover 60.

The cover guide member 70 is sewn to the first base cloth 31 of the airbag 30, has a plurality of stress concentration-reducing portions 76 formed for reducing the concentration of stress on the sewing ends of the cover guide member 70, and therefore does not peel away from the first base cloth 31 of the airbag 30.

Since the stress concentration-reducing portions 76 are arcuately formed, interference between the cover guide member 70 and the vent hole cover 60 can be prevented and the vent hole cover 60 is allowed to move smoothly.

The stress concentration-reducing portions 76, 76 have the following relationship with the first to third guiding sewn parts 73 to 75, as shown in FIG. 7. In other words, the stress concentration-reducing portions 76, 76 of the first guiding sewn part 73 are formed above the first guiding sewn part 73. The stress concentration-reducing portions 76, 76 of the second and third guiding sewn parts 74, 75 are formed below the second and third guiding sewn parts 74, 75.

The stress concentration-reducing portions 76, 76 are thus provided to the sewing ends of the first to third guiding sewn parts 73 to 75. The edge of the vent hole cover 60 moves while in contact with the stress concentration-reducing portions 76, 76 when the vent hole cover 60 moves between the first and second guiding sewn parts 73, 74, or when the vent hole cover 60 moves between the first and third guiding sewn parts 73, 75. The concentration of stress in these portions is reduced because the stress concentration-reducing portions 76, 76 are arcuately formed. Accordingly, there is no concern that the sewing ends of the guiding sewn parts 73 to 75 will be damaged by rubbing against the vent hole cover 60. Also, the vent hole cover 60 and the cover guide member 70 do not interfere with each other. Therefore, the vent hole cover 60 can move in a smooth fashion.

The length from the reference line SL1 to the distal end 72a of the guide part 72 is set to be less than the length from the reference line SL1 to the distal end 64a of the strip-shaped part 64. However, the length from the reference line SL1 to the distal end 72a of the guide part 72 is set to be greater than the length from the distal end 72a to the distal end 64a of the strip-shaped part 64. Therefore, the vent hole 34 is not blocked by the distal end 64a even when the restraint of the breakable sewn parts 51 to 53 is released and the strip-shaped part 64 is folded back toward the guide part 72 as the strip-shaped part 64 moves toward the reference line SL1.

The left and right distal ends 72a, 72a in the guide part 72 are formed in a sloping shape inclined (inclined toward the orthogonal part 63 of the vent hole cover 60) toward the reference line SL1. Therefore, the strip-shaped part 64 diagonally folds back along the inclined distal end 72a when the strip-shaped part 64 has folded back to toward the guide part 72 midway through the movement of the strip-shaped part 64 of the vent hole cover 60 toward the reference line SL1. Accordingly, the folded back state of the strip-shaped part 64 is very readily resolved. The strip-shaped part 64 can smoothly move within the guide part 72.

The guide part 72 has an opening 77 positioned in the hole center HP (FIG. 2). In other words, the opening 77 of the guide part 72 is formed in an area that corresponds to the vent hole 34. The opening 77 is a circular hole having substantially the same shape as the vent hole 34.

Next, the effect of the airbag device 13 will be described.

When collision energy of a predetermined level or higher has acted on the vehicle 10 (see FIG. 1), the inflator 20 shown in FIG. 3 generates gas and the gas is fed to the airbag 30. The airbag 30 accommodated in a folded state in the steering wheel 12 (FIG. 1) begins to be deployed by the gas. The cover (not shown) mounted on the steering wheel 12 breaks away from the tear line and forms an opening for the airbag 30 to deploy in the deployment process of the airbag 30. As a result, the airbag 30 begins to deploy inside the passenger compartment.

The airbag 30 is formed by sewing together the first and second base cloths 31, 41 using the three breakable sewn parts 51, 52, 53, as shown in FIGS. 2 and 3. Accordingly, the expansion capacity of the airbag 30 is restricted in the initial stage of deployment, and the airbag 30 rapidly reaches a homogeneous film pressure distribution within the capacity restricted between the center and the breakable sewn parts 51 to 53. At this point, when the passenger is present in a position near the steering wheel 12 and begins to make contact with the airbag 30, the rate at which the pressure inside the bag increases is restricted and the passenger can be softly restrained as the breakage of the breakable sewn parts 51 to 53 progresses together with the increase in the internal pressure.

Even when the passenger is not in contact with the airbag 30, the three breakable sewn parts 51 to 53 break in sequential fashion from the sewing start point 54 to the sewing end point 55 in accordance with the increase in the internal pressure of the airbag 30 due to the inflow of gas from the inflator 20. Accordingly, the airbag 30 gradually increases in capacity and deploys so as to achieve a predetermined form while maintaining a suitable bag internal pressure.

The distal end parts 64a, 64a of the left and right strip-shaped parts 64, 64 in the vent hole cover 60 are sewn to the first and second base cloths 31, 41 using the breakable sewn parts 51 to 53, as shown in FIG. 7. Accordingly, the distal end parts 64a, 64a are restrained by the first and second base cloths 31, 41 until the breakable sewn parts 51 to 53 break. Since the vent hole 34 is closed by the vent hole cover 60, gas inside the airbag 30 is prevented from escaping to the exterior. As a result, the gas pressure inside the airbag 30 rapidly increases and the gas pressure is suitably maintained. The gas pressure inside the airbag 30 acts on the center part of the orthogonal part 63 of the vent hole cover 60 via the opening 77 of the cover guide member 70.

Thereafter, when all the breakable sewn parts 51 to 53 are broken in the last stage of deployment of the airbag 30, the restraint of the distal end parts 64a, 64a of the strip-shaped parts 64, 64 is released. The center part in the orthogonal part 63 of the vent hole cover 60 is pressed from the vent hole 34 to the exterior. The left and right strip-shaped parts 64, 64 are pushed out and move toward the vent hole 34 while simultaneously being guided by the guide part 72 (guided by the guiding sewn parts 73 to 75). As a result, the vent hole 34 is opened. Thus, even when the increase in pressure has finished easing due to the breakable sewn parts, excessive increase in the internal pressure of the airbag 30 is prevented even after the airbag 30 has reached the ultimate shape because the excessive gas inside the airbag 30 is expelled from the vent hole 34.

The airbag of the present example is one in which the stress concentration-reducing portion 76 is formed in a loop shape composed of a first arcuate part 76a, a first rectilinear part 76b, a second arcuate part 76c, and a second rectilinear part

76*d*, as shown in FIGS. 14(*a*) and 14(*b*), but no limitation is imposed thereby. Also possible are those that include sewing in which the sewn end parts have elliptical, arcuate, or curved shapes.

Next, the method for manufacturing an airbag will be described with reference to FIGS. 16, 17, and 18.

Figure 16:
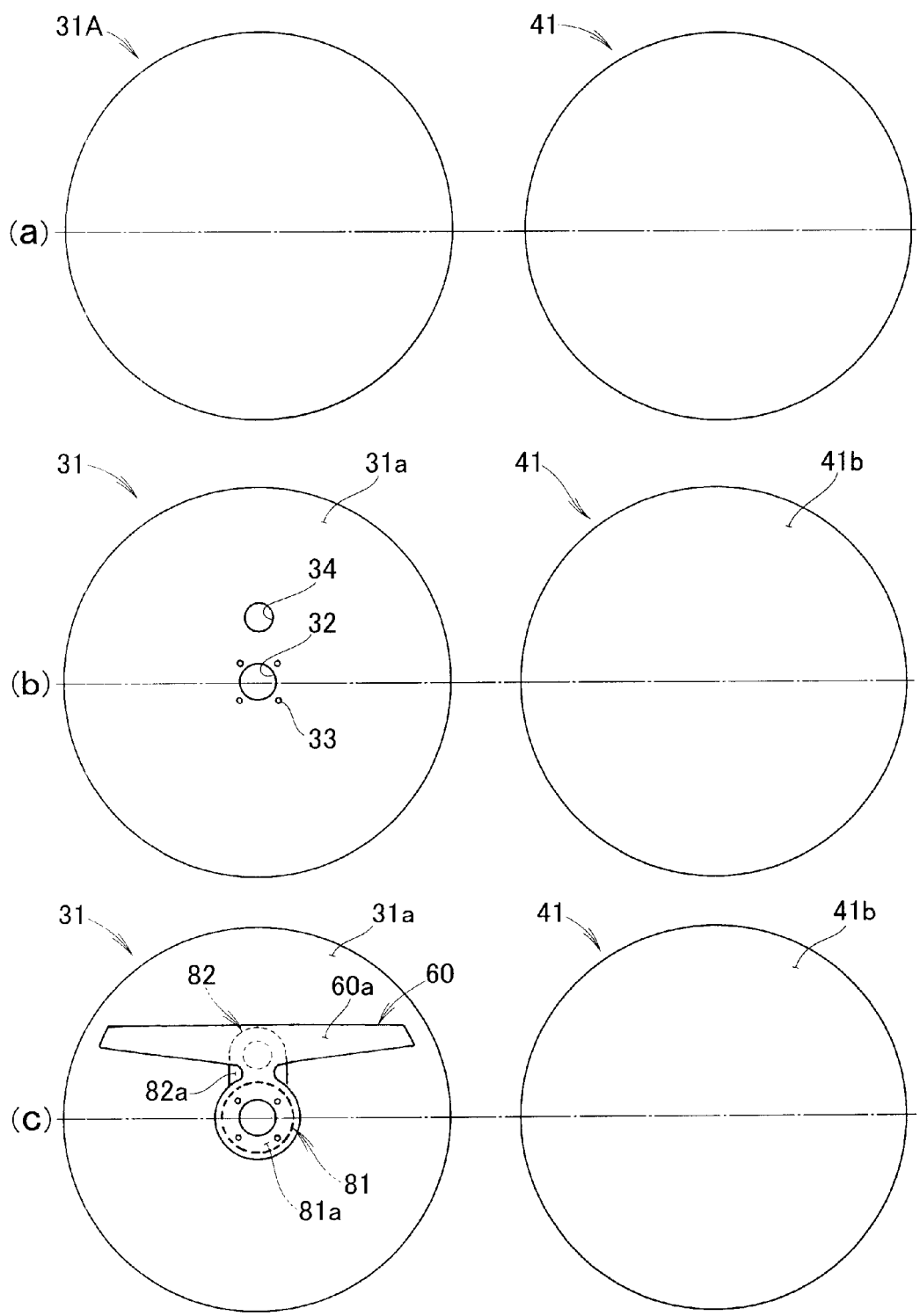
FIG. 16 illustrates a first part of the method of manufacture of the airbag according to the present invention.

In FIG. 16(*a*), an unmachined first base cloth 31A and second ground fabric 41A having a predetermined diameter are prepared.

In FIG. 16(*b*), a vent hole 34 is formed in the unmachined first base cloth 31A. Formed at the same time are an inflator insertion hole 32 for inserting the inflator 20 and four bolt holes 33 for mounting the airbag 30 to the inflator 20.

As described above, a material (sheet) treated with a silicone coating on one side only is used the first base cloth 31, the second ground fabric 41, the vent hole cover 60, and the cover guide member 70. The first base cloth 31, the vent hole cover 60, and the cover guide member 70 are disposed so that the front and back surfaces face each other. In the completed airbag 30, the inner surface of the first base cloth 31 is a coating surface 31*a* and the outer surface is a non-coating surface 31*b*. The inner surface of the second ground fabric 41 is a coating surface 41*a* and the outer surface is a non-coating surface 41*b*. The sewn part 43 is formed on the external periphery and then the airbag 30 is turned over so that the sewn part 43 of the external periphery is positioned inside away from the inflator insertion hole 32. Therefore, in FIG. 16(*b*), the first base cloth 31 is set so that the front side of the drawing is the coating surface 31*a* and the second ground fabric 41 is set so that the front side of the drawing is the non-coating surface 41*b*.

In FIG. 16(*c*), the second reinforcement sheet 82 and the vent hole cover 60 are arranged on the coating surface 31*a* of the first base cloth 31. The first reinforcement sheet 81 is arranged on the non-coating surface 31*b* (FIG. 3) of the first base cloth 31. The first and second reinforcement sheets 81, 82 and the vent hole cover 60 are sewn to the first base cloth 31. The first and second reinforcement sheets 81, 82 and the vent hole cover 60 are sewn to the front side in the drawing so as to become the coating surfaces 81*a*, 82*a*, 60*a*.

Figure 17:
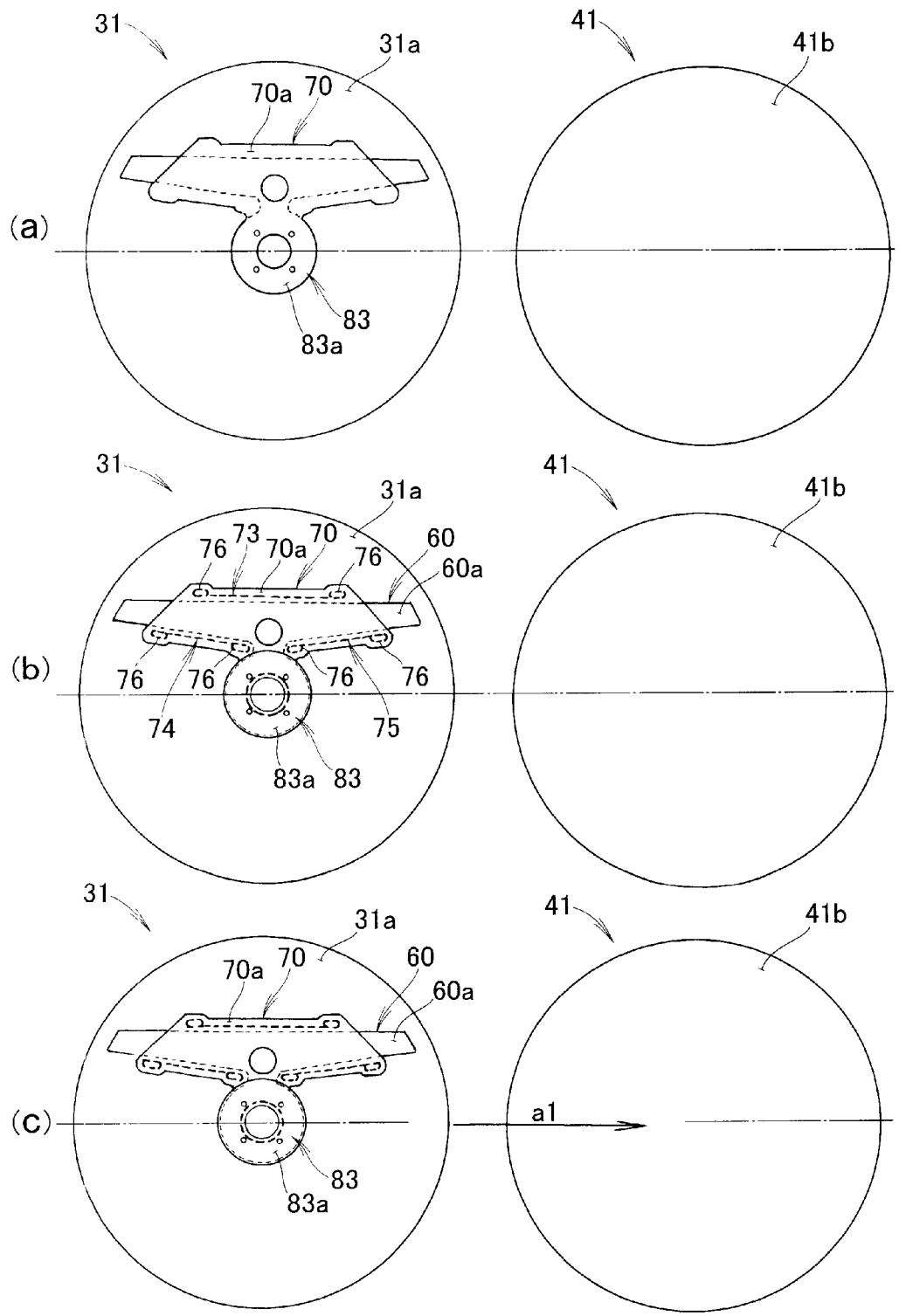
FIG. 17 illustrates an intermediate part, continuous from FIG. 16, of the method of manufacture of the airbag.

In FIG. 17(*a*), the cover guide member 70 is arranged on the coating surface 31*a* of the first base cloth 31 so as to cover the vent hole cover 60, and the third reinforcement sheet 83 is arranged on the cover guide member 70. The coating surface 70*a* of the cover guide member 70 and the coating surface 83*a* of the third reinforcement sheet 83 are arranged so as to face the front side of the drawing.

In the method for manufacturing an airbag, the vent hole cover 60, the cover guide member 70, and the first base cloth 31 in which the vent hole 34 has been formed are formed from a sheet composed of the same material having different friction characteristics on the front and back, and are arranged so that the front surface and back surface of the sheet face each other between the members 31, 60, 70, as shown in FIGS. 16(*b*), 16(*c*), and 17(*a*). The frictional characteristics (slipping characteristics) can thereby be made uniform between the members 31, 60, 70. As a result, an airbag 30 can be manufactured with deployment characteristics kept within a predetermined range.

In FIG. 17(*b*), the cover guide member 70 and the third reinforcement sheet 83 are sewn to the first base cloth 31. The guiding sewn parts 73 to 75 are formed on the cover guide member 70, and the stress concentration-reducing portions 76, 76 are formed on the guiding sewn parts 73 to 75.

In FIG. 17(*c*), the non-coating surface 31*b* (see FIG. 3) of the first base cloth 31 to which the vent hole cover 60 and the cover guide member 70 have been sewn is superimposed in the manner indicated by the arrow a1 on the non-coating surface 41*b* of the second ground fabric 41. The coating surfaces 60*a*, 70*a* of the vent hole cover 60 and the cover guide member 70 are on the front side in the drawings.

Figure 18:
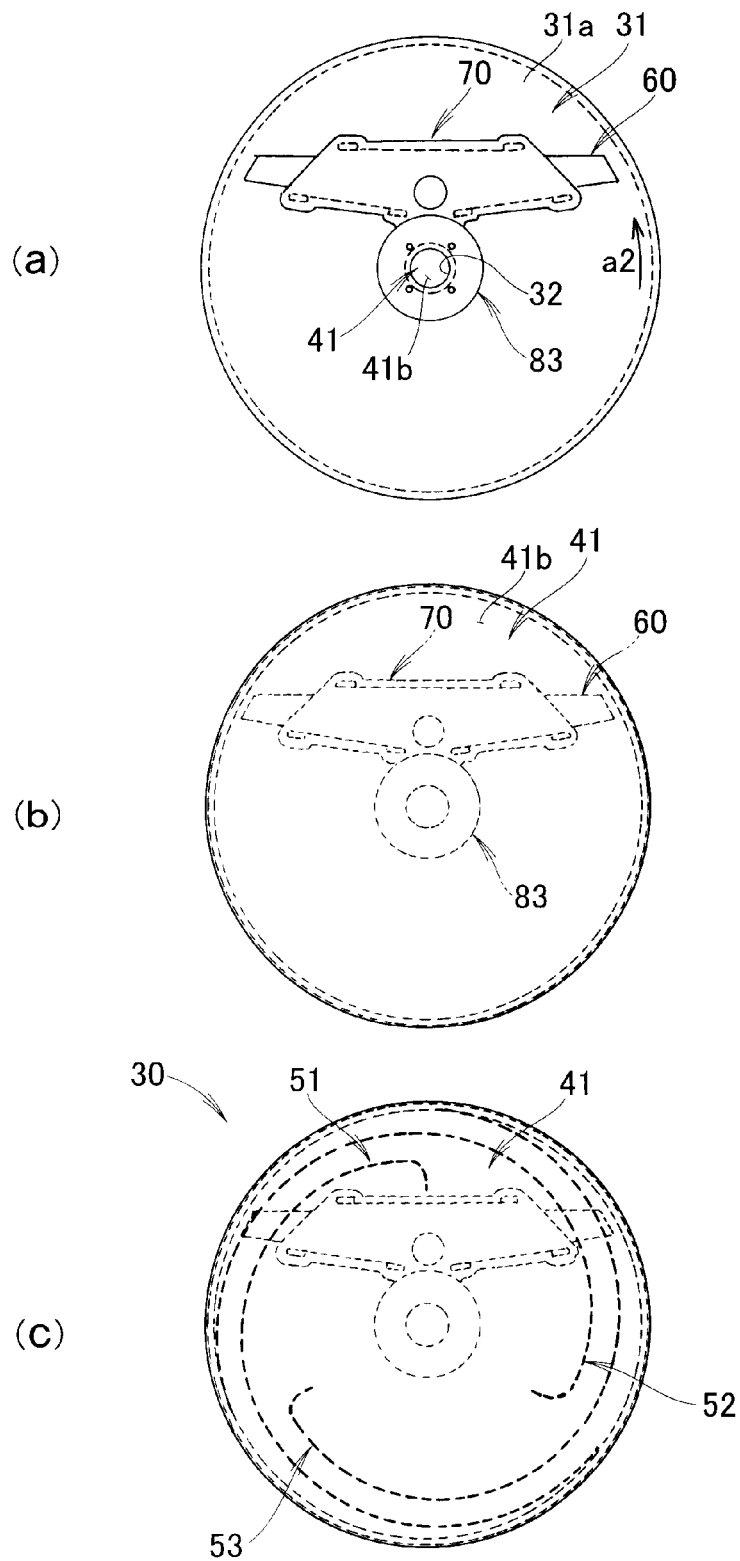
FIG. 18 illustrates a last part, continuous from FIG. 17, of the method of manufacture of the airbag.

In FIG. 18(*a*), the non-coating surface 31*b* (see FIG. 3) of the first base cloth 31 to which the vent hole cover 60 and the cover guide member 70 have been sewn are sewn in the manner indicated by the arrow a2 about the periphery of the first and second base cloths 31, 41 superimposed on the non-coating surface 41*b* of the second ground fabric 41. The second ground fabric 41 is thereafter pulled from the inflator insertion hole 32 to the front side in the drawing.

In FIG. 18(*b*), the first and second base cloths 31, 41 are turned inside out as a result of pulling the second ground fabric 41 from the inflator insertion hole 32 to the front side in the drawing. The sewn part 43 (FIG. 3) of the external periphery of the first and second base cloths 31, 41, the vent hole cover 60, and the cover guide member 70 are accommodated inside the airbag 30, and the non-coating surfaces 31*b*, 41*b* of the first and second base cloths 31, 41 are exposed (FIG. 3). In other words, the front, and back of the first and second base cloths 31, 41 are inverted.

In FIG. 18(*c*), the first and second base cloths 31, 41 (31 is shown in FIG. 3) are sewn (spiral sewing) using a plurality of strips, i.e., the three sewn parts 51, 52, 53 from the center part toward the external peripheral part in a substantially continuous fashion in the peripheral direction. A breakable sewing yarn 56 is used in the sewn parts 51, 52, 53, as shown in FIG. 6. The two end parts of the vent hole cover 60 are sewn to the first and second base cloths 31, 41 using the sewn parts 51, 52, 53.

The method for manufacturing an airbag of the present example has a process in which the periphery of the two base cloths 31, 41 are sewn together, the two base cloths 31, 41 are then sewn together using a breakable sewing thread 56 (see FIG. 6), whereby the end parts of the vent hole cover 60 are secured to the two base cloths 31, 41. Therefore, the vent hole cover 60 is secured to the first base cloth 31 and the end parts of the vent hole cover 60 can thereafter be secured to the two base cloths 31, 41. As a result, positional displacement of the vent hole cover 60 is less liable to occur.

The method for manufacturing an airbag of the present example is a method for manufacturing an airbag formed by sewing two base cloths 31, 41 together, as shown in FIGS. 3, and 16 to 18, the method comprising a step for forming a vent hole 34 in one of the two base cloths 31, 41; a step for joining a vent hole cover 60 for covering the vent hole 34 in the base cloth 31 in which the vent hole 34 has been formed; a step for joining a cover guide member 70 for restricting the movement of the vent hold cover 60 in the base cloth 31 in which the vent hole 34 has been formed; and a step for joining the periphery of the two base cloths 31, 41.

In the method for manufacturing an airbag, a vent hole 34 is formed in one of the two base cloths 31, 41, a vent hole cover 60 for covering the vent hole 34 is sewn to the base cloth 31 in which the vent hole 34 has been formed, a cover guide member 70 for restricting the movement of the vent hole cover 60 is sewn into the base cloth 31 in which the vent hole 34 has been formed, and the two base cloths 31, 41 are sewn together at the periphery. Therefore, the two base cloths 31, 41 can be sewn together after the vent hole cover 60, the cover guide member 70, and all of the other functional components have been arranged on one of the base cloths 31. Handling during manufacture of the airbag 30 is thereby facilitated. As a result, productivity of the airbag 30 can be improved.

The method for manufacturing an airbag according to the present example is an example in which the step for sewing the vent hole cover 60 and the cover guide member 70 to the first base cloth 31 is a separate step, as shown in FIGS. 16(c) and 17(b), but no limitation is imposed thereby, and the vent hole cover 60 and the cover guide member 70 can be sewn together in the same step. In this case, the vent hole cover 60 and the cover guide member 70 are preassembled.

The vent hole 34, the vent hole cover 60, the extension part 62, the orthogonal part 63, the left and right strip-shaped parts 64, the intersecting part 66, the upper edge 66a of the intersecting part, the left and right corner edges 68, 69, the cover guide member 70, the guide part 72, the opening 77, and the like are not limited to the shapes described in the present examples and may be suitably modified.

INDUSTRIAL APPLICABILITY

The present invention is advantageously applied to an automotive vehicle provided with an airbag bag unit that can expandably deploy between the passenger compartment and a seated passenger through the introduction of gas generated by an inflator.

Legend

10—vehicle; 13—vehicle airbag device; 20—inflator; 30—airbag; 34—vent hole; 60—vent hole cover; 60—extension part; 62a—distal end of extension part; 63—orthogonal part: 64—left and right strip-shaped part; 64d—distal end of strip-shaped part; 66—intersecting part; 70—cover guide member; 72—guide part; 72a—right and left distal ends of cover guide member; 77—opening; 86—hole-closing area (area corresponding to vent hole); L3—left and right distance dimensions; L4—left and right length dimensions.

The invention claimed is:

1. An airbag adapted to be deployed using gas introduced from an inflator and having a vent hole for allowing the gas to be released to outside, comprising:
a vent hole cover for covering the vent hole, the vent hole cover being capable of moving such that the vent hole opens at a predetermined internal pressure produced in the airbag; and
a cover guide member for covering the vent hole cover and for allowing the vent hole cover to move so as to open the vent hole at the predetermined internal pressure,
wherein the cover guide member has an opening formed in a part thereof corresponding to the vent hole;
wherein the vent hole cover comprises:
an extension part extending from a part corresponding to the inflator; and
an orthogonal part extending in a direction substantially orthogonal to the extension part from a distal end of the extension part,
wherein the extension part and the orthogonal part form substantially a T-shape, and an intersecting part in which the extension part and the orthogonal part intersect is formed so as to correspond to the vent hole, and the cover guide member extends toward two sides of the intersecting part so as to face the orthogonal part.

2. The airbag of claim 1, wherein the cover guide member has a distance dimension from a distal end of the cover guide member to the vent hole, and the distance dimension is greater than a distance dimension from the distal end of the cover guide member to a distal end of the vent hole cover.

3. The airbag of claim 1, wherein the distal end of the cover guide member is formed so as to slope toward the orthogonal part.

4. The airbag of claim 1, wherein the extension part has first side edges, the orthogonal part has second side edges, and distances from corner edges where the first and second side edges intersect to a peripheral edge of the vent hole is set to be less than a distance from a part other than the vent hole cover to the peripheral edge of the vent hole.

5. The airbag of claim 4, wherein the corner edges substantially match a peripheral edge of the opening of the cover guide member.

6. An airbag adapted to be deployed using gas introduced from an inflator and having a vent hole for allowing the gas to be released to outside, comprising:
a vent hole cover for covering the vent hole, the vent hole cover being capable of moving such that the vent hole opens at a predetermined internal pressure produced in the airbag; and
a cover guide member for covering the vent hole cover and for allowing the vent hole cover to move so as to open the vent hole at the predetermined internal pressure,
wherein the cover guide member has an opening formed in a part thereof corresponding to the vent hole;
wherein the cover guide member is sewn to a base cloth of the airbag and has a sewn end with stress concentration-reducing portions for reducing stress concentration on the sewn end.

7. The airbag of claim 6, wherein each of the stress concentration-reducing portion is formed arcuately.

8. A method for manufacturing an airbag formed by joining two base cloths together, comprising the steps of:
forming a vent hole in one of the base cloths;
joining a vent hole cover for covering the vent hole, in the base cloth in which the vent hole formed;
joining a cover guide member for restricting movement of the vent hole cover, in the base cloth in which the vent hole is formed; and
securing end parts of the vent hole cover to the base cloths by joining the peripheries of the base cloths and then sewing the base cloths using breakable sewing yarn.

9. The method of claim 8, wherein the base cloth in which the vent hole is formed, the vent hole cover and the cover guide member are formed from sheets of the same material having different friction characteristics on front and back surfaces; and the front surface and the back surface of the sheets are arranged so as to face each other between each of the members.

* * * * *